(12) United States Patent
Asthana et al.

(10) Patent No.: US 8,057,903 B2
(45) Date of Patent: *Nov. 15, 2011

(54) MULTILAYER ARTICLES COMPRISING RESORCINOL ARYLATE POLYESTER AND METHOD FOR MAKING THEREOF

(75) Inventors: Himanshu Asthana, Evansville, IN (US); Safwat Tadros, Evansville, IN (US); Paul Sybert, Evansville, IN (US); Christopher L. Hein, Evansville, IN (US); Edward Kung, Murcia (ES); David Rosendale, Mt. Vernon, IN (US); Xiangyang Li, Mt. Vernon, IN (US); Luca Saggese, Pittsfield, MA (US); Erich O. Teutsch, Richmond, MA (US); Glen Tryson, Malden Bridge, NY (US); Hua Wang, Clifton Park, NY (US); Hongyi Zhou, Niskayuna, NY (US); Chris Hartshorn, Schenectady, NY (US); Axel Grimm, Bergen op Zoom (NL); Theodorus J. M. Timmerman, Hoogerheide (NL); Jeroen Vervoort, Bergen op Zoom (NL); Hendrik Cornelus Jacobus De Nooijer, Middelburg (NL); Gert Boven, Steenbergern (NL); Beth Brister, Bergen op Zoom (NL); Enamul Haque, Novi, MI (US)

(73) Assignee: Sabic Innovative Plastics IP B.V. (NL)

( * ) Notice: Subject to any disclaimer, the term of this patent is extended or adjusted under 35 U.S.C. 154(b) by 2063 days.

This patent is subject to a terminal disclaimer.

(21) Appl. No.: 10/210,746

(22) Filed: Jul. 31, 2002

(65) Prior Publication Data
US 2003/0175488 A1 Sep. 18, 2003

Related U.S. Application Data

(60) Provisional application No. 60/334,513, filed on Nov. 30, 2001.

(51) Int. Cl.
*B32B 27/00* (2006.01)
(52) U.S. Cl. .......... 428/423.7; 428/412; 428/424.8; 428/424.6; 528/194
(58) Field of Classification Search .......... 528/194; 428/412, 423.7, 424.8, 424.6
See application file for complete search history.

(56) References Cited

U.S. PATENT DOCUMENTS 3,030,331 A 4/1962 Goldberg
(Continued)

FOREIGN PATENT DOCUMENTS

DE 10100745 A1 8/2001
(Continued)

OTHER PUBLICATIONS

S. M. Cohen et al., Journal of Polymer Science: Part A-1, "Transparent Ultraviolet-Barrier Coatings", vol. 9, pp. 3263-3299 (1971).
(Continued)

*Primary Examiner* — Mark Ruthkosky
*Assistant Examiner* — Tamra L Amakwe
(74) *Attorney, Agent, or Firm* — Cantor Colburn LLP

(57) ABSTRACT

Multilayer articles comprising a coating layer comprising resorcinol arylate chain members bound to a support substrate via an optional intermediate tie layer. Adhesion between the layers of the multilayer article is enhanced by modifying at least a part of a surface of at least one of the layers in the multilayer article by a technique selected from at least one of: surface adhesive treatment, surface corona treatment, flame treatment, plasma surface treatment, vacuum deposition treatment, ionization radiation, chemical surface treatment, surface abrasion treatment, and surface texturing treating.

34 Claims, 4 Drawing Sheets

U.S. PATENT DOCUMENTS

| | | |
|---|---|---|
| 3,169,121 A | 2/1965 | Goldberg |
| 3,207,814 A | 9/1965 | Goldberg |
| 3,309,261 A | 3/1967 | Schiller et al. |
| 3,391,054 A | 7/1968 | Lewis et al. |
| 3,444,129 A | 5/1969 | Young, Jr. et al. |
| 3,444,412 A | 5/1969 | De Haan et al. |
| 3,460,961 A | 8/1969 | Young, Jr. et al. |
| 3,492,261 A | 1/1970 | Young, Jr. et al. |
| 3,503,779 A | 3/1970 | Young, Jr. et al. |
| 3,505,160 A | 4/1970 | Michaels et al. |
| 3,506,470 A | 4/1970 | Young, Jr. et al. |
| 3,764,457 A | 10/1973 | Chang et al. |
| 3,791,914 A | 2/1974 | Ammons et al. |
| 3,806,486 A | 4/1974 | Endriss et al. |
| 3,892,717 A | 7/1975 | Mori et al. |
| 3,965,057 A | 6/1976 | Ammons et al. |
| 4,121,014 A * | 10/1978 | Shaffer ............... 428/412 |
| 4,127,560 A | 11/1978 | Kramer |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,281,099 A | 7/1981 | Maresca |
| 4,334,053 A | 6/1982 | Freitag et al. |
| 4,414,230 A | 11/1983 | Hanabata et al. |
| 4,487,896 A | 12/1984 | Mark et al. |
| 4,495,325 A | 1/1985 | DeBergalis et al. |
| 4,503,121 A | 3/1985 | Robeson et al. |
| 4,506,065 A | 3/1985 | Miller et al. |
| 4,576,842 A | 3/1986 | Hartsing et al. |
| 4,643,937 A | 2/1987 | Dickinson et al. |
| 4,914,143 A * | 4/1990 | Patel ............... 522/148 |
| 4,931,364 A | 6/1990 | Dickinson |
| 4,992,322 A | 2/1991 | Curry et al. |
| 5,001,000 A | 3/1991 | Rohrbacher et al. |
| 5,001,193 A | 3/1991 | Golden |
| 5,030,505 A | 7/1991 | Dickinson |
| 5,064,704 A | 11/1991 | Stewart |
| 5,098,778 A * | 3/1992 | Minnick ............... 442/224 |
| 5,103,336 A * | 4/1992 | Sieloff ............... 359/253 |
| 5,262,475 A | 11/1993 | Creasy |
| 5,318,850 A * | 6/1994 | Pickett et al. ............... 428/412 |
| 5,321,114 A | 6/1994 | Fontana et al. |
| 5,360,647 A * | 11/1994 | Sumida ............... 428/216 |
| 5,364,669 A * | 11/1994 | Sumida et al. ............... 428/1.5 |
| 5,407,751 A * | 4/1995 | Genske et al. ............... 428/516 |
| 5,446,767 A | 8/1995 | Nakagawa et al. |
| 5,486,407 A | 1/1996 | Noell et al. |
| 5,510,182 A | 4/1996 | Fontana et al. |
| 5,552,463 A | 9/1996 | Akkapeddi et al. |
| 5,601,679 A | 2/1997 | Mulcahy et al. |
| 5,738,918 A | 4/1998 | Shen et al. ............... 428/1 |
| 5,759,689 A * | 6/1998 | Sieloff ............... 428/412 |
| 5,846,659 A | 12/1998 | Löwer et al. |
| 5,885,668 A * | 3/1999 | Culbertson et al. ............... 428/1.55 |
| 5,916,997 A | 6/1999 | Webb et al. |
| 6,087,007 A | 7/2000 | Fujii et al. |
| 6,136,441 A * | 10/2000 | MacGregor et al. ............... 428/412 |
| 6,143,839 A | 11/2000 | Webb et al. |
| 6,180,195 B1 | 1/2001 | Ellison et al. |
| 6,265,522 B1 | 7/2001 | Brunelle et al. |
| 6,291,589 B1 | 9/2001 | Brunelle et al. |
| 6,294,647 B1 | 9/2001 | Brunelle et al. |
| 6,297,300 B1 * | 10/2001 | Van Nuffel ............... 524/91 |
| 6,306,507 B1 * | 10/2001 | Brunelle et al. ............... 428/423.7 |
| 6,538,065 B1 | 3/2003 | Suriano et al. |
| 6,586,091 B2 * | 7/2003 | Iijima et al. ............... 428/355 AC |
| 6,617,398 B2 | 9/2003 | Yeager et al. |
| 2001/0055671 A1 * | 12/2001 | Pickett et al. ............... 428/195 |
| 2003/0175488 A1 | 9/2003 | Asthana et al. |
| 2004/0028907 A1 | 2/2004 | Wang |
| 2004/0253428 A1 | 12/2004 | Wang et al. |

FOREIGN PATENT DOCUMENTS

| | | |
|---|---|---|
| EP | 0733 470 | 9/1996 |
| EP | 1124878 | 5/2000 |
| EP | 1 316 419 A2 | 6/2003 |
| JP | 1-199841 | 8/1989 |
| JP | 1-201326 | 8/1989 |
| JP | 6-122756 | 5/1994 |
| WO | WO 00/26274 | 5/2000 |
| WO | WO 00/26275 | 5/2000 |
| WO | WO 00/61664 | 10/2000 |
| WO | WO 0069945 | 11/2000 |

OTHER PUBLICATIONS

William M. Eareckson, III, Journal of Polymer Science, "*Interfacial Polycondensation. X. Polyphenyl Esters*", vol. XL, pp. 399-406, 1959.

U.S. Appl. No. 09/368,705, filed Aug. 5, 1999.

U.S. Appl. No. 09/908,387, filed Jul. 18, 2001.

DuBois and Pribble's "Plastics Mold Engineering Handbook" Fifth edition, 1995, pp. 468-498.

International Search Report, Internation Application No. PCT/US 02/27751, 3 pages.

International Search Report; International Application No: PCT/US2005/000050; Applicant's Reference No. RD 137826; International Filing Date: Jan. 3, 2005; Date of Mailing: May 30, 2005.

Pizzi, A. et al.; Ed.; "Handbook of Adhesive Technology"; Marcel Dekker, Inc.; New York; 1994; ISBN 0-8247-8974-1; pp. 405-429.

Skeist, Irving, Ed.; "Handbook of Adhesives, Third Edition"; Van Nostrand Reinhold; New York; 1990; ISBN 0-442-28013-0; pp. 359-380.

Qi-Wei Lu, et al; "Compatibilized Blends of Thermoplastic Polyurethane (TPU) and Polypropylene"; Macromol. Symp.; 2003; 198; pp. 221-232.

* cited by examiner

MULTILAYER ARTICLES COMPRISING RESORCINOL ARYLATE POLYESTER AND METHOD FOR MAKING THEREOF

CROSS-REFERENCE TO RELATED APPLICATIONS

This application is related to and claims priority from Provisional Application No. 60/334,513 filed on Nov. 30, 2001, the entire contents of which are incorporated by reference herein.

FIELD OF THE INVENTION

This invention relates to articles having a coating layer comprising resorcinol arylate polyester chain members, and a method for preparation the multilayer articles.

BACKGROUND OF THE INVENTION

Compositions and weatherable multilayer articles comprising resorcinol arylate chain members are known. See Published Patent Application Nos. EP 1124878 and WO0069945. The prior art references generally discuss methods to manufacture multilayer articles by various processes including co-injection molding, coextrusion, overmolding, multi-shot injection molding, sheet molding and placement of a film of the coating layer material on the surface of a substrate layer optionally followed by adhesion of the two layers by a tie-layer, with the coating layer comprising resorcinol arylate polyester chain members. In some applications, the multilayer article as taught in the prior art may be separated into the constituent substrate layer and the coating layer comprising resorcinol arylate chain members. If applied onto a substrate, i.e., wood, metal, plastic, paper, etc. as a protective carrier/weatherable layer, the inter-layers or intra-layers in the prior art may undergo separation.

Thermoset plastics are commonly used for automotive body panels including appearance parts, having to undergo extensive surface preparation to provide a weatherable, smooth, glossy surface, which always requires a coating of some type. Producing the desired surface is expensive and time consuming and detracts from the excellent mechanical properties of the thermoset materials. Without the proper finishing work a painted surface will not meet the automotive class "A" requirements due to imperfections in the surface from exposed glass fibers, glass fiber "read-through," "paint popping," long and short term waviness, "orange peel," and variations in gloss. Overmolding of thin, preformed paint films is also possible, but only for compositions that are capable of being molded to provide nearly perfect surfaces without secondary operations. The as-molded surface quality has been improved considerably over the last few years, but all parts to be painted still have to be sanded, especially at the edges, and sealed and primed prior to painting. In-mold coating can obviate these operations, but only at the cost of greatly increased cycle time and cost. The process uses expensive paint systems that may be applied to the part surface while the mold is re-opened slightly, then closed to distribute and cure the coating. Surface improvements have also been obtained by the addition of low profile additives. Such additives reduce the "read-through" at the surface by causing minute internal voids due to the high stresses in the resin as it shrinks due to polymerization and differential shrinkage of the glass and resin as the part cools. The voiding of the additive relieves the stresses and provides a smoother surface. If the void occurs at the surface however, a defect may result in the finish. The voids also act as stress concentrators, which may cause premature failures under additional stress or appear during the general sanding at the surface and leave a pit that the painting process can't hide.

One alternate approach in the prior art is to adhere a thin, high quality surface film to the molded part during or after the molding operation, also known as in-mold decorating or overmolding. Such films are generally highly crosslinked films based on acrylics or fluoropolymer films, which are very expensive and need special adhesive layers, adding cost and additional sources for defects and failure. The films are generally thin due to the expense of the fluoropolymer, or brittleness if acrylic and their method of production. The thin layers also make it difficult to maintain a uniform color when the film is non-uniformly stretched to conform to the part.

Applicants have found that substrate comprising resorcinol arylate chain members may be use as a weatherable surface with high gloss and hardness, providing a class "A" finish in thermoset molding, for use in automotive parts. Applicants have also found that the use of certain tie-layers surprisingly increase the adhesion between layers of a multilayer article, with a coating layer comprising resorcinol arylate chain members and the substrate layer, or the adhesion between the multilayer article comprising a coating layer of resorcinol arylate chain members and a substrate layer with another surface. We have also found that the adhesion between the layers can be significantly improved by various surface modification methods, by modifying the surface of at least one of the layers in a multilayer article.

SUMMARY

Disclosed herein articles. In another embodiment the multilayer article can comprise: a coating layer comprising a block copolyestercarbonate comprising structural units derived from a 1,3-dihydroxybenzene and a aromatic dicarboxylic acid, a second layer, a tie-layer comprising a polyurethane, and a substrate layer. The second layer can comprise a polymer comprising carbonate structural units. The coating layer can be in contiguous superposed contact with the second layer, and the tie-layer can be in contiguous contact with the second layer and the substrate layer. An adhesion of the tie-layer to the substrate layer can provide a ninety-degree peel force of at least 1,750 Newtons per meter.

In a further embodiment the multilayer article can comprise: two outer layers comprising resorcinol arylate polyester chain members; an inner layer being sandwiched between the two outer layers, the inner layer comprising polyurethane.

In one embodiment a multilayer structure can comprise: an outer layer comprising resorcinol arylate polyester chain members having pigments, a tie-layer comprising polyurethane, and a substrate layer. The substrate layer can comprise at least one of a thermoplastic polycarbonate, a thermoplastic polyester, a polyolefin, a polyamide, a polyacrylonitrile, a polystyrene, and a polyvinyl chloride. An adhesion of the tie-layer to the substrate layer can provide a ninety-degree peel force of at least 1,750 Newtons per meter.

In yet another embodiment the multilayer structure can comprise: an outer layer comprising resorcinol arylate polyester chain members: a tie-layer comprising polyurethane; and a substrate layer comprising a metal. An adhesion of the tie-layer to the substrate layer can provide a ninety-degree peel force of at least 2,101 Newtons per meter.

DESCRIPTION OF THE INVENTION

Figure 1A:
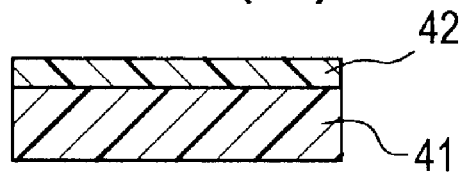
FIGS. 1(A), (B), and (C) are schematic section views respectively illustrating examples of a multilayer article obtained in accordance with the present invention.

The instant invention is for an article having an surface/coating layer comprising resorcinol arylate polyester chain members. In one embodiment, the article is a multilayer structure with the coating layer comprising resorcinol arylate polyester chain members. The instant structure displays good adhesion properties, good mechanical properties, weatherability, and UV resistance.

Coating/Weatherable Layer Comprising Resorcinol Arylate Polyester Chain Members. The outer layer of the article of the present invention is comprised of arylate polyester chain members. Said chain members comprise at least one diphenol residue in combination with at least one dicarboxylic acid residue.

Suitable dicarboxylic acid residues include aromatic dicarboxylic acid residues derived from monocyclic moieties, preferably isophthalic acid, terephthalic acid, or mixtures of isophthalic and terephthalic acids, or from polycyclic moieties, including diphenyl dicarboxylic acid, diphenylether dicarboxylic acid, naphthalenedicarboxylic acid such as naphthalene-2,6-dicarboxylic acid. In one embodiment, the dicarboxylic acid is 1,4-cyclohexanedicarboxylic acid.

In one embodiment, the diphenol residue is derived from a 1,3-dihydroxybenzene moiety, as illustrated in Formula 1, commonly referred to as resorcinol or resorcinol moiety.

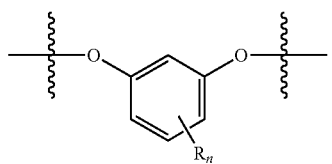

In Formula I, R is at least one of $C_{1-12}$ alkyl or halogen, and n is 0-3. Examples of Resorcinol or resorcinol moiety includes both unsubstituted 1,3-dihydroxybenzene and substituted 1,3-dihydroxybenzenes.

In one embodiment, the aromatic dicarboxylic acid residues are derived from mixtures of isophthalic and/or terephthalic acids (ITR) as typically illustrated in Formula II.

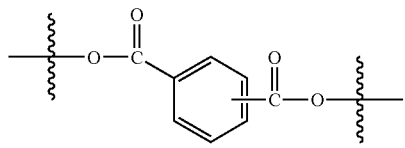

In one embodiment of the laminated structure, the outer layer or the coating layer comprises resorcinol arylate polyester chain members as illustrated in Formula III wherein R and n are as previously defined:

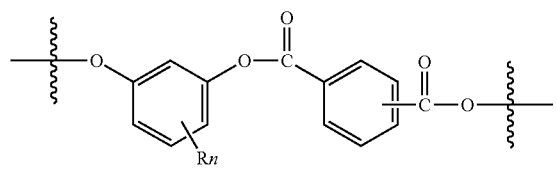

In one embodiment, the outer layer is a blend of polymers comprising resorcinol arylate polyester chain members and at least one other polymer selected from at least one of miscible, immiscible, and compatibilized blends including but not limited to: polycarbonates, polyesters, polyetherimides, polyphenylene ethers, PC/ABS, PC/ASA, PC/PBT, PC/PET, PC/polyetherimide, polyamide, polyester/polyetherimide, polyphenylene ether/polystyrene, polyphenylene ether/polyamide, polyphenylene ether/polyester, blends, regrinds and foams of any of the above. In another embodiment, the outer layer is comprised of a block copolyestercarbonate comprising resorcinol arylate-containing block segments in combination with organic carbonate block segments as disclosed in Patent Application EP 1124878. In other embodiments, the copolyestercarbonate comprises about 10% to about 99% by weight arylate blocks, or more specifically, the copolyestercarbonate comprises about 60% to about 98% by weight arylate blocks.

In one embodiment of applications wherein high levels of scratch and/or chemical resistance are required, the amount of resorcinol arylate-containing block segments is in the range of about 50 to 100 mole %. In other embodiments with a lesser requirement for scratch and chemical resistance, the level is about 20 to 50 mole percent.

The composition may additionally contain art-recognized additives including but not limited to metal flakes, pigments, dyes, impact modifiers, UV screeners, flame retardants, fillers, stabilizers, flow aids, ester interchange inhibitors, and mold release agents. Pigments include both clear pigments such as inorganic siliceous pigments (silica pigments for example) and conventional pigments used in coating compositions. In one preferred embodiment, the weatherable coating layer is a clear layer with no pigment or dye in the composition.

The weatherable coating layer may be produced as a separate layer, followed by application to a second layer of the multilayer article of the present invention. It can also be produced by simultaneous productions of the layers in a production process. Thus, the weatherable coating layer may be produced and employed in such methods but not limited to molding, extrusion, co-injection molding, co-extrusion, overmolding, coating, and the placement of the layer onto the surface of a second layer.

In one embodiment, the weatherable coating layer is placed or "coated" onto the surface of a second layer via a coating process. The coating process may include but not limited to a fluidizing process involving a fluidized bed of powered ITR, for the substrate or article bearing the substrate to be coated with the weatherable layer containing ITR. In another embodiment, the ITR is dissolved in a fugitive solvent, and the weatherable layer is used to "coat" a second layer or a substrate by various well-known coating means, including but not limited to dipping, spraying, rolling, dipping, flow-coating, or combinations thereof. Fugitive solvents are meant to include solvents or other liquids that evaporate and leaves the weatherable coating containing arylate polyester chain members behind after the weatherable coating layer has been deposited on the substrate. Examples of fugitive solvents include but not limited to, 1,3-dioxolane, 1,3-dioxane, 1,4-dioxane, tetrahydrofuran, y-butyrolactone, acetonitrile, dimethyl formamide, methylene chloride chloroform, chlorobenzene or mixtures of these solvents. The fugitive solvents may optionally contain stabilizers and/or surfactants. Surfactants are surface-active compounds including protective colloids, dispersants, etc. Examples of such surfactants are polyalkylene oxides, alkyl and aryl sulfonates, quaternary ammonium salts, alkyl, aryl or ether sulfates, polyvinyl alcohols, partly hydrolyzed polyvinyl acetates, polyvinyl pyrrolidone, olefin/maleic anhydride copolymers, formaldehyde condensates, formaldehyde condensates and alkoxylated phenol/formaldehyde condensates.

In one embodiment, wherein the second layer or substrate is coated with a layer containing resorcinol arylate polyester chain members in a coating application, the thickness of the layer containing arylate polyester chain members is from 0.1 µm to 5 µm. In other applications, particularly non-coating applications, the weatherable coating layer is between 0.5 and 150 mils thick. (1 mil is $\frac{1}{1000}$ inch)

Substrate Layer. In one embodiment of the invention, the article comprises a substrate which functions as a support layer or a "colored" layer. The substrate includes but not is limited to one of a film layer or layers, a sheet layer or layers, a multi-wall sheet ("MWS"), a molded polymer substrate, a pre-formed metal substrate or combinations thereof, with the outer weatherable layer comprising resorcinol arylate polyester chain members being adhered to at least one side of the substrate layer.

In applications wherein the multilayer article of the present invention is in the form of a film for subsequent use on a pre-formed substrate, the substrate layer of the multilayer film helps serve as a reinforcement to facilitate the handling of the weatherable coating layer which may have relatively little inherent tensile strength. In other applications, the substrate layer may incorporate color pigments, metal flakes, etc. to provide special color effects to the coating layer containing resorcinol arylate polyester chain members, which may be clear/colorless.

In one embodiment, the substrate layer is in the form of a film, in conjunction with the outer layer, forming a protective film for various end-use applications. The support film may be from about 1 and 200 mils thick, and in most applications, having a minimum thickness of 5 mils to ensure good thermoformability and support properties. In another film embodiment, the support film is about 5 and 25 mils thick, being capable of withstanding lamination conditions without adversely affecting its properties.

In a second embodiment and depending on the polymer resin used and the intended application of the multi-layer article, the substrate layer is in the form of a sheet having a thickness of about 4 to 100 milimeters (mm).

In yet another embodiment, the substrate layer is a pre-formed substrate made from a hard, rigid polymer providing a substrate onto which the coating layer is adhered to. In yet another embodiment, the substrate layer is a pre-formed substrate made from glass, ceramics, or a metal such as steel or aluminum, e.g., an automotive panel. In a fourth embodiment, the substrate layer is a metal sheet, onto which the weatherable layer containing resorcinol arylate polyester chain members is adhered to.

In one embodiment, the support layer may comprise any of a thermoplastic such as an aromatic polycarbonate, a polyester, a polyamide, a polyolefin, a thermoplastic polyolefin (TPO), a polyacrylonitrile (e.g., ABS), acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/polybutylene terephthalate and impact modifier (XENOY® resin from General Electric Company), blends of polycarbonate/PET/PBT, polyamides, phenylene sulfide resins, polymethylmethacrylate (PMMA), High-impact Polystyrene (HIPS), polystyrene, poly(vinyl chloride) PVC, a copolyestercarbonate, a poly(alkylene dicarboxylates), methacrylic ester polymers and copolymers or blends thereof, which can be melt-extruded into shaped articles such as films and sheets.

In another embodiment, the substrate layer is a molded polymer substrate selected to provide the required engineering properties, e.g., rigidity, etc., suited to the specific end-use of the multilayer article. Suitable polymers for the substrate include, for example, polyvinyl chloride, polycarbonate, polystyrene, acrylonitrile-butadiene-styrene, polyethylene, polypropylene, polyethylene terephthalate, nylon, and RIM urethanes. Polypropylene, for example, when glass filed and foamed with a blowing agent, is a suitable polymer for the molded substrate. Acid copolymers of polyethylene such as SURLYN (a trademark of E.I. DuPont de Nemours) are also suitable. In one embodiment, the substrate layer is a molded substrate comprising RIM urethanes. Urethane polymers useful for preparing the molded substrate are typically prepared by reacting a polyisocyanate with a compound containing at least two active hydrogen atoms, such as a polyol, a polyamine, or a polyisocyanate.

In yet another embodiment, the substrate layer is a pre-formed substrate comprising thermoplastic vulcanisates (TPVs), which are compatible with engineering thermoplastics. Other examples of the substrate include an unsaturated polyester resin (UPR), a vinyl ester resin (VE), and/or other thermosettable resins. Other examples of thermosettable polymers include epoxies, cyanate esters, diallyl phthalate, acrylics, alkyds, phenol-formaldehyde such as resoles and novolacs, melamine, bismaleimides, benzocyclobutanes, hydromethylfurans, and isocyanates. The substrate may also include parts produced by various processes such as compression molding of sheet molding compounds (SMC), bulk molding compounds (BMC), thick molding compounds (TMC), injection transfer molding, reinforced reaction injection molding (RRIM), or structural reaction injection molding (SRIM). Sheet Molding Compound or SMC is generally a highly filled and glass fiber reinforced, unsaturated polyester/styrene material made in sheet form. Bulk Molding Compound or BMC is similar to SMC, but prepared as a bulk material not as sheet. The molding temperature range for SMC and BMC actually overlaps that for forming resorcinol arylate polymer resin comprising the coating layer, which greatly simplifies processing of the multilayer article.

In some embodiments, the compound materials are glass filled, using for examples, long-glass-fibre-reinforced thermoplastics (LFT) with variable glass contents, or long-fiber injection (LFI) technology.

In one embodiment, the substrate layer is a preformed film, prepared by known liquid casting methods. In another embodiment, the substrate layer may comprise a liquid cast polymer film formed from urethane polymers, acrylate polymers, vinyl polymers, fluoropolymers and blends thereof. Other examples include a cast film comprising an alloy of an acrylic polymer and polyvinylidene fluoride.

In yet another embodiment, the substrate layer is a pre-fabricated composite structure, e.g., a laminar film structure that includes a polyimide and a fluoropolymer, a laminar composite containing a thermoplastic or thermoset polymer layer and a continuous cellulosic fibrous web, etc. In another embodiment, the substrate layer is a laminate substrate produced by impregnating a fibrous substrate with a resin varnish, drying the substrate to prepare a prepreg, stacking one or more prepregs to a desired thickness, and finally curing the assembly under heat and pressure to laminate/mold the substrate layer. In yet another embodiment, the substrate comprises woven fibers or glass fibers.

In another embodiment, the substrate layer is an optically transparent layer of a material selected from the group consisting of acrylic polymer, polycarbonate, ionomer, glass, halogenated polymer, polyolefin, polyester, and polyvinyl butyral. By the term polycarbonate is meant carbonate polymers possessing recurring structural units of the formula:

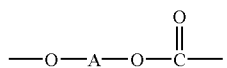

wherein A is a divalent aromatic radical of the dihydric phenol employed in the polymer reaction. Suitable aromatic polycarbonate resins include linear aromatic polycarbonate resins and branched aromatic polycarbonate resins. Suitable linear aromatic polycarbonates resins include, for example, bisphenol A polycarbonate resin. Suitable branched polycarbonates are known and are made in various embodiments by reacting a polyfunctional aromatic compound with a dihydric phenol and a carbonate precursor to form a branched polymer.

The dihydric phenol which may be employed to provide such aromatic carbonate polymers are mononuclear or polynuclear aromatic compounds, containing as functional groups two hydroxy radicals, each of which may be attached directly to a carbon atom of an aromatic nucleus. Typical dihydric phenols are: 2,2-bis(4-hydroxyphenyl) propane; hydroquinone; resorcinol; 2,2-bis(4-hydroxyphenyl)pentane; 2,4'-(dihydroxydiphenyl) methane; bis(2-hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl)pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethy-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, spiro biindane bis phenol, and the like.

The term "polyolefin resins" means resins which are polymerized with an olefin monomer such as propylene, ethylene or butene and can be selected according to the required performance of a product such as heat resistance, flexibility and transparency. The resins may be used alone or in admixture of a plurality of polyolefin resins in consideration of their crystallinity, noncrystallinity and elasticity. Examples of polyolefin resins include polypropylene homopolymers such as isotactic polypropylene, syndiotactic polypropylene and atactic polypropylene, polyethylene resins, propylene α-olefin copolymers or ethylene α-olefin copolymers having at least one α-olefin monomer such as ethylene, propylene, butene, pentene, hexene, heptene, octene or 4-methylpentene-1, ethylene vinylacetate copolymers, ethylene vinylalcohol copolymers, ethylene acrylic acid copolymers, cyclic polyolefin resins such as those made from pentadiene and/or derivatives, and the like. In one embodiment, the polyolefins used include conventional low density polyethylene (LDPE) made under high pressure; LDPE copolymers incorporating other α-olefins polyethylene/vinyl acetate copolymers; linear low density polyethylenes (LLDPE), which include copolymers of ethylene with one or more of propylene, butene, hexene, 4-methyl pentene-1, octene-1, and other unsaturated aliphatic hydrocarbons. In one embodiment, the α-olefins are propylene, butene-1, hexene-1,4-methylpentene-1 and octene-1.

By the term polyester is meant a thermoset polyester or a thermoplastic polyester. Examples of thermoplastic polyester include but not limited to poly(alkylene dicarboxylates), poly (ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETA"), and poly(1,4-cyclohexanedimethyl-1,4-cyclohexanedicarboxylate) (hereinafter sometimes designated "PCCD"), poly(alkylene arenedioates), and polyesters available from renewable agricultural or other resources, such as vegetable or animal material, biomass, i.e., formed of polylactic acid.

By the term polyamide is meant resins such as nylon-6, nylon-6,6, nylon-6,10, and nylon-6,12.

Either virgin materials or regrind (or recycled) materials can be used in the substrate layer. Examples of recycled engineering plastics for use in the substrate layer include polycarbonate, polyphenylene ether, many of the polyesters and polyester blends, polyamides, acetal polymers and copolymers, thermoplastic polyurethanes, polyarylates which are based on resorcinol, and the like.

In some embodiments of the invention, e.g., automotive applications wherein the multilayer article is used for automotive body panels including appearance parts, and to achieve sound damping, it is contemplated that the substrate layer further includes a foam layer as an adjacent layer as a support or inner layer. The foam layer helps achieve lower cost, weight reduction and sound damping with its 10 to 50% density reduction. The foam may be foamed in place as disclosed in U.S. Pat. No. 5,486,407 to Noell et. al. It is also contemplated that the substrate layer may further include, or may be adhered to a cellulosic based material such as a particleboard, fiberboard, chipboard or plywood. It is also contemplated that abrasive resistant coatings such as described in U.S. Pat. No. 5,446,767 may be utilized in conjunction with the substrate layer.

In one example of automotive applications, the substrate layer comprises polycarbonate resin (as a color and adhesive layer) since polycarbonate adheres to both the coating layer comprising resorcinol arylate polymer and to another substrate system, e.g., thermoset resins systems as SMC and BMC. The thickness of the multilayer article comprising a polycarbonate substrate layer and the coating layer is chosen to be sufficient to cover minor surface blemishes on the SMC/BMC parts resulting in a durable, high grade, even class "A" finish required for automotive applications. The high concentration of styrene monomer at elevated temperature and pressure do not appear to affect the polycarbonate/resorcinol arylate polymer multilayer film article in any way. Even after long exposure of the polycarbonate, there does not appear to be any crazing of the surface due to solvent effects of the styrene monomer. It is contemplated that similar results are obtainable with other processes such as RIM, SRIM, TMS, RRIM or RTM and with non-standard material formulations such as TSN based thermosets. TSN is Thermoset Noryl, a commercially available product from General Electric Company.

The substrate layer may include art-recognized additives typically known for inclusion in films and sheets, including pigments, a colorant or decorative material such as metal flakes, dyes, luminescent compounds, impact modifiers, UV screeners, flame retardants, fillers, stabilizers, flow aids, ester interchange inhibitors, adhesion promoting agents such as a bisphenol derivative, an aminosilane or derivatives, and mold release agents. Conventional pigments include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes.

Examples of ultraviolet light absorbers (UVA) include benzotriazole, benzophenone, triazine, cyanoacrylate, dibenzoylresorcinol, benzoxazinone and oxanilide based UVA. In addition to UV absorbers, hindered amine light stabilizers (HALS) can also be used. Illustrative ultraviolet radiation absorbing compounds include 2-(benzotriazol-2-yl)-4-(1,1,3,3-tetramethylbutyl)phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2'-ethylhexyl-2,2-diphenyl-1-cyanoacrylate, 2-(2'-hydroxy-4'-octyloxy)bis-4,6-(2',4'-dimethylphenyl)triazine, 2-ethyl-2'-ethoxy oxalanide, bis[2-hydroxy-5-methyl-3-(benzotriazol-2-yl)phenyl]-methane, bis[2-hydroxy-5-t-octyl-3-(benzotriazol-2-yl)phenyl]methane, 2,2'-(1,4-phenylene)bis[4H-3,1-benzoxazin-4-one], and 2-(2'-hydroxy-4-hexyloxy)-4,6-diphenyltriazine.

In a preferred embodiment, pigments that are stable at high temperatures are used, i.e., colorants that do not substantially degrade or altered at temperatures at or about 350° C. Examples include Solvent Yellow 93, Solvent Yellow 163, Solvent Yellow 114/Disperse Yellow 54, Solvent Violet 36, Solvent Violet 13, Solvent Red 195, Solvent Red 179, Solvent Red 135, Solvent Orange 60, Solvent Green 3, Solvent Blue 97, Solvent Blue 104, Solvent Blue 104, Solvent Blue 101, Macrolex Yellow E2R, Disperse Yellow 201, Disperse Red 60, Diaresin Red K, Colorplast Red LB, Pigment Yellow 183, Pigment Yellow 138, Pigment Yellow 110, Pigment Violet 29, Pigment Red 209, Pigment Red 209, Pigment Red 202, Pigment Red 178, Pigment Red 149, Pigment Red 122, Pigment Orange 68, Pigment Green 7, Pigment Green 36, Pigment Blue 60, Pigment Blue 15:4, Pigment Blue 15:3, Pigment Yellow 53, Pigment Yellow 184, Pigment Yellow 119, Pigment White 6, Pigment Red 101, Pigment Green 50, Pigment Green 17, Pigment Brown 24, Pigment Blue 29, Pigment Blue 28, Pigment Black 7, Lead Molybdates, Lead Chromates, Cerium Sulfides, Cadmium Sulfoselenide, and Cadmium Sulfide.

In one embodiment of the invention, the amount of colorants used in the substrate layer may be up to 5 wt. % for opacity. In another embodiment of the invention, a combination of colorants are used with some of the colorant being added at low levels for use as a toner. In a third embodiment, Solvent Yellow 163 is used in an amount of about 0.35% to provide a yellow colored substrate.

In another embodiment, in addition to the conventional pigments and colorants in the art, the substrate layer further comprises at least a lightfastness compound, a lightfastness antioxidant, and a lightfastness ozonant.

Examples of lightfastness compounds include didodecyl-3,3'-thio dipropionate, tris(4-tert-butyl-3-hydroxy-2,6-dimethyl benzyl) isocyanurate, 1,3,5-trimethyl-2,4,6-tris(3,5-di-tert-butyl-4-hydroxybenzyl) benzene, N,N'-.beta.,.beta.'-naphthalene-4-phenylene diamine, or 4,4'-methylene-bis (dibutyl dithio-carbamate), (6) 2,2,4-trimethyl-1,2-hydroquinoline. Examples of lightfastness antioxidant include but not limited to: didodecyl-3,3'-thio dipropionate, tris(4-tert-butyl-3-hydroxy-2,6-dimethyl benzyl) isocyanurate, 1,3,5-trimethyl-2,4,6-tris(3,5-di-tert-butyl-4-hydroxybenzyl) benzene, N,N'-.beta.,.beta.'-naphthalene-4-phenylene diamine, 4,4'-methylene-bis(dibutyl dithiocarbamate), 2,2,4-trimethyl-1,2-hydroquinoline. Examples of lightfast antiozonant compounds are N,N'-bis(1,4-dimethyl pentyl)4-phenylene diamine, 2,4,6-tris-(N-1,4-dimethylpentyl-4-phenylene diamino)-1,3,5-triazine, 6-ethoxy-1,2-dihydro-2,2,4-trimethyl quinoline, bis-(1,2,3,6-tetrahydrobenzaldehyde) pentaerythritol acetal, and the like.

Optional tie-layer. In one embodiment of the multilayer article of the present invention, at least one tie-layer is used. The tie-layer(s) can be placed between the coating layer and the substrate layer(s) to enhance the bond between the coating layer and the substrate, or on the outer surface of the substrate layer for subsequent adhesion to another surface. The tielayer(s) may also be placed between substrate layers to enhance adhesion between layers. Depending on the applications, the tie-layer can be of a multi layer form, with each tie-layer comprised of a different material for selective bonding to either the coating layer, the substrate layer and/or the surface of the substrate. In one embodiment, the tie-layer is a co-extruded film of two different heat sensitive adhesive resins for bonding dissimilar substrates, i.e., the coating layer and the substrate layer, or the substrate layer of the multilayer article on the present invention and a base substrate which the multilayer article is to adhere to.

The tie-layer ensures both a good adhesion of the coating layer comprising resorcinol arylate polyester chain members and the substrate layer(s), or the substrate to which the coating layer or the multilayer article is adhered. The tie-layer may contain any polymeric material which improves the interply adhesion between the layers of the multilayer article, or between the multilayer article and the substrate it is meant to protect or cover. In one embodiment, the tie-layer contains a blend of the materials constituting the substrate layer and the materials comprising resorcinol arylate polyester chain members.

In one embodiment, the tie-layer is a compatible blend of: a) at least one of polycarbonate or a resorcinol arylate containing resin; and b) at least one of an ester containing resin, a polyester carbonate containing resin, a resorcinol arylate containing resin and blends thereof. In another embodiment, the tie-layer is a polyester selected from the group of: PET, PETG, PBT, PPT, PEN, PBN, PCT, PCTA, PCTG, PCCD and the like. In yet another embodiment, the tie-layer is a transparent polyester selected from the group of PETg, PCT, PCTg, PCCD.

In another embodiment of a tie-layer, the material is a compatible blend of polyester and polycarbonate, e.g., transparent polyester/polycarbonate blends prepared from PETg, PCT, PCTA, PCTg, and PPCD and BPA polycarbonate. The BPA polycarbonate can be either linear or branched. In one example, the tie-layer is a blend of about 20 to 40% PETg and 60 to 80% polycarbonate. In another example, the tie-layer is a compatible blend of a PCT and BPA having about 10 to 100% PCT and 0 to 90% polycarbonate. In a third example, the tie-layer is a compatible blend of a PCTA and BPA polycarbonate, containing about 10 to 100% PCTA and 0 to 90% polycarbonate.

In one embodiment of a compatible blend of: a) a resin comprising polyester with polycarbonate; and b) a resin comprising resorcinol arylate units, the transparent polyester/polycarbonate blends are prepared from PBT, PET, PETg, PCT, PCTA, PCTG. In one embodiment, the resorcinol arylate resin contains from 70 to 95% resorcinol arylate units and from 5 to 30% BPA and resorcinol carbonate units.

In one example, the tie-layer is a blend containing about 10 to 50% PBT and 50 to 90% a resin comprising of resorcinol arylate units. In another example, the tie-layer is a compatible blend of a PET and a resin comprising of resorcinol arylate units, containing about 10 to 50% PET and 50 to 90% of a resin comprising resorcinol arylate units. In yet another example, the tie-layer is a compatible blend of a PETg and a resin comprising resorcinol arylate units, with about 10 to 50% PETg and 50 to 90% a resin comprising resorcinol arylate units. In another embodiment, the tie-layer is a compatible blend of a PCT and a resin comprising resorcinol arylate units, with about 10 to 50% PCT and 50 to 90% a resin comprising of resorcinol arylate units. In an embodiment of a compatible blend of a PCTA and a resin comprising resorcinol arylate units as a tie-layer, the blend contains about 10 to 50% PCTA and 50 to 90% a resin comprising of resorcinol arylate units. In one embodiment of a compatible blend of a PCTG and a resin comprising resorcinol arylate units, the blend contains about 10 to 50% PCTG and 50 to 90% a resin comprising of resorcinol arylate units.

In one embodiment of a tie-layer containing a blend of materials constituting the substrate layer and the coating layer, the tie-layer is a transparent blend of a poly(1,4-cyclohexanedimethyl-1,4-cyclohexanedicarboxylate) ("PCCD") and polycarbonate. Applicants have found that use of a blend of PCCD and polycarbonate afford a layer with ductility, and increased adhesion between the weatherable coating layer and a support layer of polycarbonate. The blends of PCCD/PC have excellent clarity, physical and mechanical properties. In one embodiment, the blend comprises about 20 to 100 wt. % PCCD and about 80 to 0 wt. % of the polycarbonate.

In one embodiment of a tie-layer, the tie-layer may comprise ester side groups such as in polymethyl methacrylate and polymethyl methacrylate copolymers. The preferred compositions are those with excellent clarity and melt processability.

In another embodiment, the tie-layer is a compatible blend of a resin comprising of a resorcinol arylate and a copolymer comprising of BPA arylates and BPA carbonates.

Suitable ITR resins comprising resorcinol arylate blocks are known; see for example the descriptions and methods for preparation given in Published Patent Application Nos. EP 1124878 [RD 26354] and WO0069945 [RD 26310]. In one embodiment of a resin comprising resorcinol arylate units, the % of resorcinol arylate is from 10 to 90% and the % of BPA and resorcinol carbonates is from 10 to 90%.

Suitable copolyestercarbonates are comprised of aromatic BPA polycarbonate units and aromatic polyester units.

Applicants have found that blends of polyestercarbonate and ITR are compatible with increased heat deflection temperature (HDT), ductility, and increased adhesion between the weatherable coating layer and a support layer of polycarbonate. Applicants have surprisingly found that only a small portion of these blends afford a layer with excellent clarity. Furthermore, the clarity of the polyestercarbonate/ITR tie-layer varies depending on the concentration of polyestercarbonate employed, the amount of ester groups in the polyestercarbonate and the amount of resorcinol arylate groups in the ITR.

In one embodiment wherein the polyestercarbonate comprises ~70 wt % ester or greater and the weight percentage of polyestercarbonate is greater than about 50% in the tie-layer blend formulations, the blends have good clarity (less than 30% haze). In another embodiment, wherein the polyestercarbonate comprises ~70 wt % ester or greater and the weight percentage of polyestercarbonate is greater than about 80% in the tie-layer blend formulations, the clarity is excellent. In examples wherein the weight percentage of polyestercarbonate is kept the same, the tie-layer blends have better clarity with polyestercarbonate having a high wt. % of the ester group. In embodiments with high concentration of polyestercarbonate with a high wt. % ester and with excellent clarity of the tie-layer blends, only one $T_g$ is detected thus indicating that only one phase exists.

In one embodiment, the blend comprises 10 to 99 wt. % polyestercarbonate and about 1 to 90 wt. % of the ITR. In one embodiment, the blend comprises 80 to 95 wt. % polyestercarbonate and about 5 to 20 wt. % of the resin comprising of resorcinolarylate blocks.

In another embodiment of a tie-layer containing a blend of materials constituting the support layer and the coating layer, the tie-layer is a compatible blend of a polyestercarbonate ("PPC") and polycarbonate. This blend of PPC and polycarbonate provides a tie-layer with increased heat deflection temperature (HDT), ductility, increased adhesion between the weatherable coating layer and a substrate layer of polycarbonate with excellent clarity, physical and mechanical properties. In one embodiment, the blend comprises 10 to 100 wt. % PPC and about 0 to 90 wt. % of the polycarbonate. In one embodiment, the copolyestercarbonates are comprised of aromatic BPA polycarbonate units and aromatic polyester units. In embodiments wherein the polyestercarbonate comprises ~20 wt % ester or greater and the weight percentage of polyestercarbonate is greater than about 20%, the tie-layer has excellent clarity.

The following table summarizes embodiments of various tielayers for use in enhancing the adhesion between the coating layer comprising resorcinol arylate polyester chain members, and a substrate layer comprising polycarbonate:

a) Polyester as a tie-layer, with the polyester is preferably a transparent polyester selected from the group of PETG, PCTG, PCT, PCTA, and PCCD.
b) A polyestercarbonate as a tie-layer, with the polyestercarbonate comprising about 10 to 90% ester, with the Iso/Tere ratio of about 0/100 to 100/0.
c) An ITR of lower ester, comprising about 5 to 95% ITR.
d) A PMMA.
e) A blend of ITR and a polyester, with the polyester selected from the group of PCCD, PETG, PCTA, PCT, PCTG, PBT, and PET.
f) A blend of polycarbonate and polyester, with the polyester selected from the group of PCCD, PETG, PCTA, PCT, PCTG, PBT, and PET.
g) A blend of polycarbonate and polyestercarbonate, having 10 to 80% arylate in the blend.
h) A blend of ITR of lower ester, and a polyestercarbonate.

In one embodiment wherein the multilayer structure of the present invention is to adhere to/mold onto a thermoset or metal substrate, the tie-layer is comprised of a thermoplastic resin selected from the group of an ethylene/vinyl acetate copolymer (EVA), a polyester, a copolyester, a copolyamide, a polyurethane (TPU), a styrene block copolymers (SEBS), a modified SBES, or blends thereof. Polyurethanes (PU) comprise long polyol chains that are tied together by shorter hard segments formed by the diisocyanate and chain extenders if present. Polyol chains are typically referred to as soft segments, which impart low-temperature flexibility and room-temperature elastomeric properties. Generally, the higher the soft segment concentration, the lower will be the modulus, tensile strength, hardness, while elongation will increase. Polyols for use as tie-layers in the multilayer article of the present invention can be generally broken into three categories: 1) polyether polyols, 2) polyester polyols, and 3) polyols based on polybutadiene. In one embodiment of the invention, tie-layers comprising polyols having polyether backbones are found to have excellent hydrolytic stability especially desired for automotive applications.

Examples of commercially available tie-layers include adhesive films sold as Xiro XAF 36.154 from Adhesive Films, Inc; polyolefin adhesive films sold as Bemis 6218, Bemis 6329, Bemis 6340 from Bemis Adhesive Films and Coatings; and two-component PU adhesives Araldite 2040, 2042, and AW8680/HW8685 from Vantico Inc.

In one embodiment, the tie-layers are ethylene vinyl acetate copolymer (EVA), including maleic anhydride functionalized ethylene-vinyl acetate copolymers. Examples are BYNEL® CXA 3101® sold by E. I. du Pont de Nemours and Company, providing good adhesion and transparency.

In another embodiment of the invention, the tie-layers are polyolefins or modified polyolefins, including but not limited to polyethylene, conventional low-density polyethylene (LDPE), and linear low-density polyethylenes (LLDPE). In one example, the tie-layers are based on maleic acid modified waxy ethylene polymers as described in U.S. Pat. No. 3,892, 717 with good adhesion and transparency. The term "maleic acid compound" comprises maleic acid, maleic anhydride and the $C_1$ to $C_8$ dialkyl esters of maleic acid. Examples are modified polyolefin with functional group such as ADMER®0 from Mitsui Chemicals. In yet another embodiment, the tie-layers are blends of a polyolefin component and high-density polyethylene (HDPE) grafted with an unsaturated fused ring carboxylic acid anhydride. Examples are anhydride-modified polyolefins tie-layer adhesives available from Equistar under the tradename Plexar®.

The optional tie-layer or layers may include art-recognized additives including but not limited to pigments, a colorant or decorative material such as metal flakes, dyes, UV screeners, flame retardants, fillers, stabilizers, and the like.

The tie-layer may be from about 0.5 to about 50 mils, and in one embodiment, having a minimum thickness of about 1 mil to ensure good thermoformability and adhesion characteristics. The thickness of the tie-layer depends on the final geometry and shape of the multi-layer article, and may vary depending on the location within the article itself.

The tielayer or tielayers may be used in different physical form depending on the application process employed. The tielayer or tielayrs may be in the form of a coextrudable pellet comprising a single material or blends of materials. The tie-layer may be in the form of a heat activated or thermoset laminate or multilayer laminate comprised of a single or multiple tielayer materials. In addition, the tielayer may be in the form of a mat of woven fibers comprising any one or several of the materials suitable as tielayers for the adherent surfaces selected.

Uses of the article of the present invention. Articles of the present invention are useful in a variety of applications where it is desired to have a high quality weatherable and/or paint-like appearance on the article, e.g., in applications: (a) having a need for an adequate life span upon exposure to heat, sun, chemicals, and/or the like; (b) are scratch resistant, have luster, and are resistant to marring; (c) having high gloss and retention of same; (c) having a need for depth of image and color uniformity; (d) are resistant to gasoline, solvents and/or acid spotting; (e) having satisfactory hardness and/or abrasion resistance; (d) having acceptable UV resistance; (e) are resistant to water and humidity exposure; (f) may be made so as to have generally consistent coloration throughout at least one color layer, i.e., throughout the substrate or colored layer; (g) may be made so that metallizing material/particles can be approximately uniformly distributed throughout the substrate or color layer(s) of the article; and (h) may be made using readily available industrial equipment such as vacuum forming devices, extrusion devices and/or injection molding machines.

Examples of such applications including automotive components, e.g., automotive panels, windshields, side windows, sunroofs, etc. Other examples include architectural or building applications, e.g. skylights, or glass windows. In architectural applications, the multi-layer articles can be used as a single-sheet having a multilayer structure, or in groups of multiple sheets. The groups of multi-sheets are sometimes referred to as walls, as in multi-wall sheet or MWS, with ribs running the length of the sheets and separating the multilayer articles or sheets from one another.

Molded articles or formed parts comprising the multi-layer articles of the present invention exhibit surprising weatherability, particularly stability, when exposed to ultraviolet light for extended periods of time. These articles exhibit the low loss in gloss, low haze formation, and low color shift measured using, for example, the CIE 1976 (CIE LAB) color scale, needed for molded parts used in exterior applications.

In one embodiment of an automotive application, formed parts comprising the multi-layer articles of the present invention exhibit delta E (color shift) values of less than about 3, which is a level considered as suitable for exterior automotive applications. In another embodiment of an automotive application and when exposed to 2500 kilojoules/square meter in a Xenon-arc weatherometer (SAE J1960), formed parts comprising the multi-layer articles of the present invention exhibit excellent gloss retention over time with gloss loss value of less than about 20%. In yet another embodiment of the invention, the multi-layer articles are used in automobile fascia applications having DOI ("depth of image") of at least 80 and superior mar resistance.

For multi-wall sheets, skylights and architectural glazing applications, wherein materials with low haze formation are required when exposed to 10,000 kilojoules/square meter in an Atlas Ci35a xenon arc weatherometer equipped with borosilicate inner and outer filters at an irradiance of 0.77 W/m² at 340 nm. Typical operating conditions include: temperatures of black panel 70° C., dry bulb 45° C., wet bulb depression 10° C. The cycle time is 160 minutes (min) light followed by 5 min dark and 15 min dark with water spray.

In one embodiment, the article is a multilayer structure of: a) coating layer; b) a first tie-layer; c) substrate layer; d) a second tie-layer; e) molded substrate or another substrate layer. In another embodiment, the tie-layer is placed behind the substrate layer for subsequent adhesion to another substrate, thus forming a multilayer structure of: a) a coating layer; b) a substrate layer; c) a tie-layer; d) a base substrate. In a third embodiment, the optional tie-layer can be part of a structure comprising: a) a coating layer; b) a tie-layer; and c) a pre-formed substrate. In a fourth embodiment, the article is in the form of the coating layer comprising resorcinol arylate polyester chain members being adhered directly onto a pre-formed substrate. In a fifth embodiment of an automotive application, the article is a multilayer sheet structure of: a) a weatherable coating layer; b) a substrate layer; and c) another layer of the weatherable coating. In a sixth embodiment the article is a multilayer structure of: a) a coating layer; b) a tie layer; and c) a molded substrate.

Depending on the applications and the processing method, and whether a tie-layer film or multiple tie-layer films are used, a support layer or multiple support layers are used, whether the coating layer comprising arylate polyester chain members is in the form of an extruded film, a molded layer, or a coating, the multilayer article may be represented as in FIGS. 1(A)-1(D). FIG. 1(A) illustrates a two-layer structure. In this embodiment, the multilayer article is in the form of a film or a sheet, with a $1^{st}$ layer 42 being the weatherable coating layer comprising resorcinol arylate polyester chain members, and a $2^{nd}$ layer 41 being a support layer. This two-layer article may be used as a high gloss cover/outer layer for exterior trim parts in automotive applications, such as front fascias and body cladding of cars.

Figure 1B:
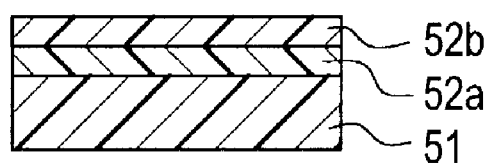

FIG. 1(B) illustrates a three-layer structure, with the first layer being the weatherable coating layer 52B comprising resorcinol arylate polyester chain members, being laminated on the surface of a tie-layer 52A, which is used to enhance the adhesion between the coating layer 52B and the substrate layer 51. In a different embodiment of a three-layer structure (figure not shown), the weatherable coating layer comprising resorcinol arylate polyester chain members and the support layer are laminated onto (or co-extrided with) a tie-layer. This multilayer article may be subsequently used as an exterior layer to be laminated onto a substrate base for outdoor/weatherable applications such as automotive parts.

Figure 1C:
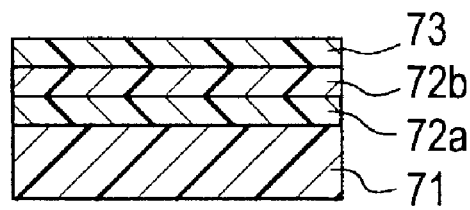

FIG. 1(C) illustrates a four-layer structure. In one embodiment of FIG. 1(C), the weatherable coating layer comprising resorcinol arylate polyester chain members 73, the tie-layer 72b, and the substrate layer 72a, are laminated onto an additional tie-layer 71. This multilayer article may be subsequently used as an exterior layer to be laminated onto a substrate base for outdoor/weatherable applications such as automotive parts.

Figure 4:
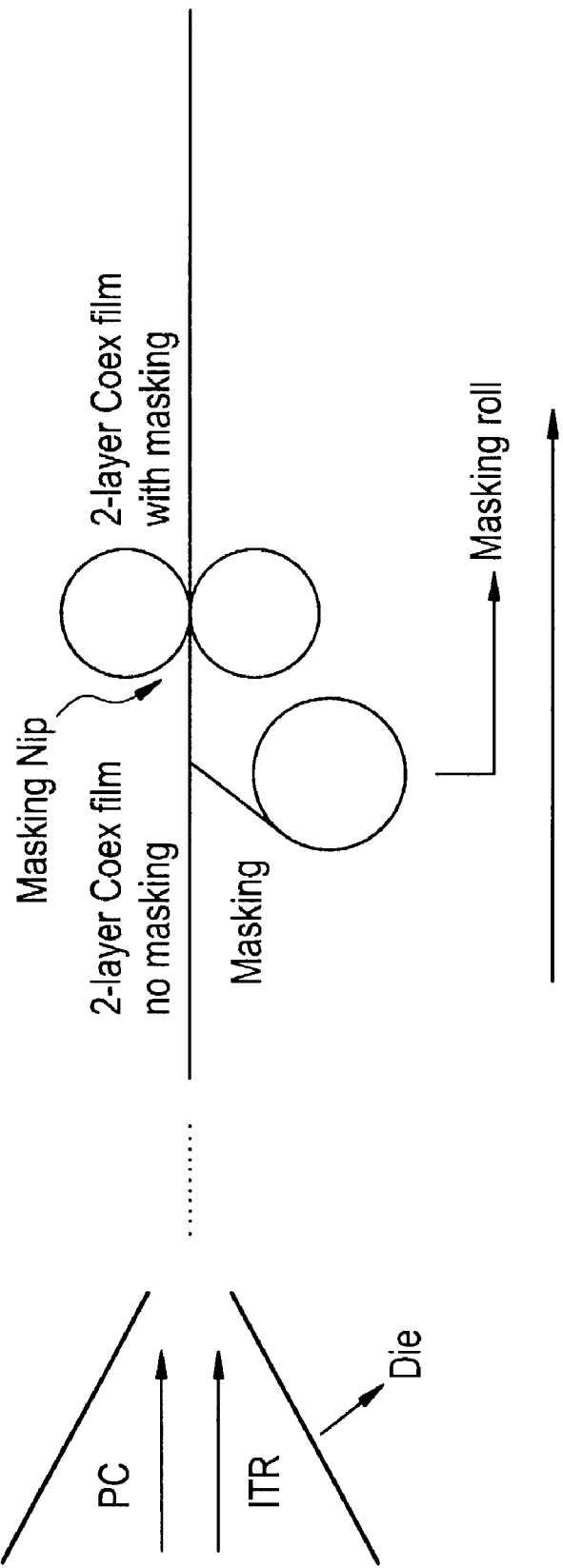
FIG. 4 is a schematic view illustrating a method of applying a masking layer to the multilayer article of the present invention.

In another embodiment, the multilayer structure of the present invention is subsequently masked by a protective film layer or layers prior to transport to customers. FIG. 4 illustrates a process to apply a masking layer to the multilayer article of the present invention.

In one example, the masking layer is comprised of polyethylene(s) or blends thereof. For high temperature applications wherein the multilayer article (including the masking layer) is used, the masking may be a high-density polyethylene. For other applications, polypropylenes may be used for the masking layer. The masking layer can be used to "cover" or "protect" the weatherable coating layer comprising resorcinol arylate polyester chain members, covering its gloss surface. It can be used with no adhesive or with a thin (coating) layer of adhesive to help keep the masking layer on the weatherable coating layer. In most applications, the masking layer "clings" to the weatherable coating layer by the electrostatic charge alone. Leaving a carefully chosen masking film on the exterior surface of the multilayer article of the invention, i.e., the exterior of the weatherable coating layer comprising resorcinol arylate polyester chain members, also helps protect the surface from damage even during molding. In fact it may even protect the surface from very minor imperfections found in the mold surface.

In another embodiment of the invention, instead of a masking layer which can be peeled off, a coating layer which complements the properties of the coating layer resorcinol arylate polyester chain members is used. The protective coating layer may comprise acrylate resins or silicone hard coat resins. The coating layer may be applied by a coating process including but not limited to fluidizing, dipping, brushing, rolling, spraying, flow-coating or combinations thereof.

The multilayer article of the present invention can be subsequently processed and used in a variety of applications. For example, the finished multilayer article can be rolled into a roll for shipping to a processor/molder for various applications, e.g., in-mold decoration, or in a hot press. In one application, the multilayer article in the form of a film is fed from the source roll into a mold cavity to form shallow contoured parts, with a different material being injected behind it. In another example, it is vacuum thermoformed into a desired three-dimensional configuration. In one example, a multilayer article comprising: a) weatherable coating comprising resorcinol arylate polyester chain members, b) an adhesive acrylic as a tie-layer, and c) a PVC film as a substrate layer, is first placed into a mold as a surface layer, a moldable polymer such as PVC is next introduced as a substrate layer, and the surface layer comprising the multilayer article of the present invention and the PVC substrate are molded for a time and temperature sufficient to form a shaped article, with the multilayer article bonded to the outer surface thereof of the PVC.

Methods For Forming The Multilayer Article. The multilayer article of the present invention can be constructed by various processing techniques known in the art including but not limited to extrusion, co-extrusion, casting, coating, vacuum deposition, lamination, molding, and combinations thereof.

Within co-extrusion, various techniques are employed. In one embodiment, two or more layers of the multilayer article are extruded from separate extruders through separate sheet dies into contact with one another when hot, and then passed through a single sheet of rollers. In another embodiment, the polymer melts of the materials constituting the coating layer, the optional tie-layer or layers, and the substrate layer or layers, are brought together and into contact with one another through a co-extrusion adapter/feedblock and then through a single or multi-manifold die. The adapter/feedblock is constructed such that the melts forming the separate layers are deposited as adherent layers on the melt of the center layer. After co-extrusion, the multilayer length of the melt produced can be formed into desired shapes, solid sheets or multi-wall panels, in an extrusion die connected downstream. The melt is then cooled under controlled conditions in known manner by means of calendering (solid sheet) or vacuum sizing (multi-wall panel) and subsequently cut into lengths. An annealing oven may be optionally provided after sizing or calendering for the reduction of stresses.

Figure 2:
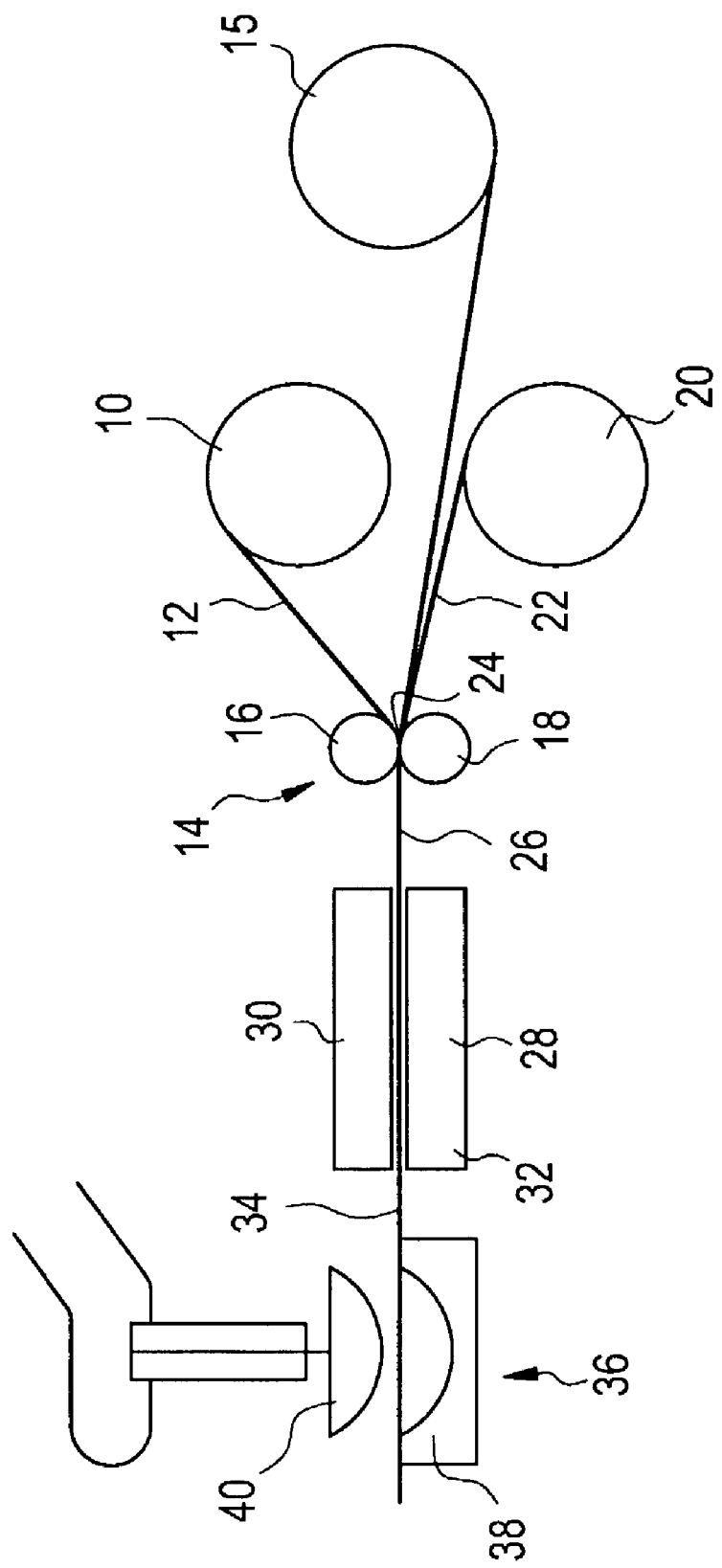
FIG. 2 is a schematic view illustrating of a method of manufacturing a multilayer article in accordance with one embodiment of the invention.

FIG. 2 is an illustration of the co-extrusion process. The resin comprising resorcinol arylate polyester chain members is melt-extruded as molten by an extruder (not shown) and fed to feed block 4 through feed pipe 1 connected to the extruder. A tie-layer material is extruded as molten by an extruder (not shown), and fed to one side of the weatherable layer in the feed block 4 through a feed pipe 2. In the same manner as described above, a material for use as the substrate layer is fed to the other side of the tie-layer through a feed pipe 3. In the feed block 4, the molten polymers meet one another at the junction of three passages to form a three-layer molten polymer in which the tie-layer serves as the intermediate layer on one surface of which the weatherable ITR layer is being laminated and on the other surface of which the substrate layer is being laminated. The molten polymer is fed to a single manifold T-die 5, i.e., a single-layer die, connected to the feed block 4, and then extruded in the form of a film.

The three-layer film 6 extruded from the T-die 5 is cooled by a cooling roll 7 and pressed by a pressure roll 8 opposite to the cooling roll 7. After the film 6 has passed through rolls 9 and 10, the multilayer film is then wound on a winding roll 12.

The extruding temperature may be suitably set according to the type of the polymers used. Generally, such a temperature is generally not less than the softening point of the polymer used. Other conditions such as polymer extruding speed, cooling roll temperatures, film drawing speeds, and the like may be set according to the characteristics of the desired multilayer film and final applications. The film extruded from the T-die 5, or after winding roll 12, may be subjected to a surface treatment such as corona discharge treatment, sputtering treatment, flame treatment, etc., or a combination of various surface treatment techniques, prior to being used on a substrate in a final application.

In one embodiment, wherein the coating layer comprising resorcinol arylate polyester chain members or a multilayer structure comprising the coating layer is used directly on a substrate, conventional molding techniques are used. In an example of an injection molding process to form the multilayer article of the present invention, the coating layer comprising resorcinol arylate polyester chain members, or a multilayer film structure having a coating layer comprising resorcinol arylate polyester chain members may be: a) heated and vacuum formed in a separate forming mold prior to being placed in the injection mold, wherein the molded polymer substrate is subsequently formed; or b) shaped and heated by pressure along with a moldable polymer in the injection mold.

In an example wherein the coating layer comprising resorcinol arylate polyester chain members is used directly on a substrate, the layer comprising resorcinol arylate polyester chain members is coated on the substrate in a coating process including but not limited to fluidizing, dipping, brushing, rolling, spraying, flow-coating or combinations thereof.

In another example, the multi layer article is prepared by lamination, after the various free-standing layers in the structure are prepared by various processes including liquid casting, extrusion, molding, and stretching operations. According to one process, one of layer is a sheet, which may be provided directly in the path of the melted materials exiting the extruder so that melted flowing material is fed directly into contact with sheet prior to cooling. At the laminating station, the extrudate in melt form is contacted with a solid sheet.

In one embodiment, an extruded coating layer film comprising resorcinol arylate polyester chain members is thermally laminated onto a roll of tie-layer or layers of films using a laminator having heated bottom and top rolls. In another example, the coating layer is adhesively laminated onto a substrate layer using a tie-layer film.

In yet another example of a laminated multilayer structure, the separate layers, i.e., the weatherable coating layer, the optional tie-layer(s), and the substrate layer(s), are brought into contact with one another and then passed through a single set of rollers for a single sheet line. In another embodiment, the various diverse layers including the tie-layers, are tacked together and then heated to a high temperature sufficient to heat and fuse the films or sheets together, with the optional tie-layer disposed therebetween the coating layer and the second layer, or as a backing of the second layer. In one embodiment of the thermofusing step, appropriate heating temperature control is achieved by heating with an infrared-heating source. In one embodiment of the in-line thermofusing process, pressure is applied for 15-75 milliseconds at an increased level, beginning at low levels to avoid distortion of the component films. The time and amount of pressure applied will vary according to the polymers used for the layers, temperatures applied, the thickness of the layers, and other parameters.

The multilayer article of the present invention can be further processed various ways. In one embodiment, it is thermoformed. Thermoforming comprises simultaneously heating and forming the multilayer article, e.g., an extruded sheet, into the desired shape. Once the desired shape has been obtained, the formed article is cooled below its thermoplastic temperature and removed from the mold. Thermoforming methods and tools are described in detail in DuBois and Pribble's "Plastics Mold Engineering Handbook", Fifth Edition, 1995, pages 468 to 498. Thermoforming methods may also be utilized as set forth in U.S. Pat. No. 5,601,679 to Mulcahy et al.

In another embodiment, the mutlilayer article of the present invention, e.g., in the form of a sheet, may be vacuum formed. Typically, the vacuum former and surrounding metal framework are preheated to minimize chill of the sheet. The sheet is placed on a vacuum box and mounted on the bottom side of the former or platten. Clamp frames are activated for mechanically holding the sheet in place. A suitable heat shield, such a aluminum foil, may be utilized for avoiding heating the surface at selected locations such as other than a sink portion. The sheet is then exposed to the thermo-forming ovens. Top and bottom heaters may be used. During heating, the sheet begins to sag. Once the sheet reaches its proper forming temperature, the assembly is shuttled to a vacuum forming box where sink is vacuum formed in a box. The box has a plurality openings in a mold form for drawing the sheet into mold during the forming operation. After cooling, the resulting formed sheet is removed.

In vacuum molding, the multilayer article, e.g., in the form of a sheet is placed over a concave mold and heated such as by an infra-red heater. Vacuum is applied to draw the sheet into place against the mold cavity. The sheet above may be modified by combining positive air pressure on top of the extruded sheet with vacuum from the underside to increase the molding force. In another process, matched or compression molding, matched male and female molds or dies are employed and the extruded sheet is formed between the mechanically compressed molds. Molds are typically made from a metal having high thermal conductivity such as aluminum.

Optional Surface Enhancement Steps. In one embodiment of the invention, before the separate layers of the multilayer article are assembled together according to any of the methods described above (e.g., thermofusing or lamination), at least one surface of at least one of the separate layers is "surface enhanced" according to one of the methods below.

The surface of the layer to be surface-enhanced can be the "inner" surface of the coating layer comprising resorcinol arylate polyester (ITR) chain members, one or both surfaces of the tie-layer or layers, one or both surfaces of the substrate layer, or the "outer" surface of the pre-formed substrate, which surface is to be coated or covered by the ITR coating layer, or a multilayer film comprising an ITR coating layer. Surface modification can enhance the adhesion between the separate layers of the multilayer article.

1. Surface adhesive treatment. In one example of surface enhancing, an adhesive coating is applied onto at least one surface of any of the layers: the coating layer comprising arylate polyester chain members, the tie-layer, or the substrate layer. In another example, an adhesive coating is applied to the pre-formed substrate onto which the multilayer article of the present invention is to be adhered.

The method of applying the adhesive coating includes but not limited to the followings: spraying a thin layer of the adhesive layer on at least one surface of any of the layers in the multilayer article, roll-coating at least one of the surfaces, dip coating at least one of the film layer as it exits an extruder line, spraying the adhesive coating on at least one of the surfaces, roll brush coating, air knife coating, impregnation and curtain coating, either singly or in combination.

In one embodiment of the invention, the adhesive coating is a clear exterior urethane. Adhesive coatings are generally applied in liquid or semi-liquid form for a thickness of about 25 to 50 microns thick. Besides the desired result of enhanced adhesion, the use of a clear exterior urethane provide further advantages of enhanced scratch resistance, enhanced resistance to surface crazing, and in some applications, aesthetics to increase gloss and depth of color in appearance.

2. Surface corona treatment. Corona surface treatment is a process in which a large, high frequency electrical field ionizes and excites components of the air such as oxygen ($O_2$), creating a corona which contains positive, negative, and neutral species. These species impact the electrostatically charged surface of the weatherable coating layer and/or the substrate layer, causing chemical changes which improve surface energy and bonding.

In one embodiment, one of the film layers, i.e., the outer coating layer or the substrate layer, is passed between two conductor elements which act as electrodes and a sufficiently high voltage is applied to enable corona discharges to take place. As a result of such discharges, the air above the surface of the film layer becomes ionized and combines with the molecules on the surface of the film so that polar incorporations are formed in the essentially nonpolar polymeric matrix. In one embodiment, the amount of the treatment is about 600 $J/m^2$ to 12,000 $J/m^2$. In another embodiment, it is about 1,200 to 9,000 $J/m^2$.

The corona treatment brings about a change to the surface of the layer, making it wettable and thus resulting in a strong adhesive bond between the corona-treated layer and a second surface. In one embodiment, a primer is applied onto the corona-treated surface to further enhance the adhesions between the layers of the multilayer article.

3. Flame treatment. Besides corona treatment, the flame treatment process can be used to enhance the adhesive-ability of a film layer by making it wettable. In this process, oxygenated flame is used to create free oxygen for a short period of time, e.g., a fraction of a second to a few seconds, on the surface of the film layer of the multilayer article whose surface is to be enhanced. The free oxygen reacts with the polymeric surface of the layer and raises the surface energy level prior to the next operation, wherein the layer is to be adhered to at least another layer.

Optimum flaming conditions can be controlled by varying the various parameters including the gas/air ratio (dependent on the gas used, town gas, methane, propane, etc.); laminar or turbulent flow flame; distance of the burner to the film surface. The amount of the treatment is generally at least 8,000 $J/m^2$. In one embodiment, this level is about 8,000 to 200,000 $J/m^2$. If the amount of flame treatment is not sufficient, the effect of flame treatment is insufficient and enhanced adhesion is not certain.

4. Plasma surface treatment This adhesion enhancement method includes the use of synthetic gaseous plasmas comprising mobile, positively and negatively charged particles which interact with the surface of the film layer in the multilayer article that requires enhanced adhesion. Various types of gaseous plasmas may be used such as inert gas plasmas of helium, neon, argon or krypton, oxygen and hydrogen plasmas, and in some applications, organosilane plasmas. In such treatment, the film layer is passed through an enclosure in which the gaseous plasma is formed such that at least the exterior surface film layer to be enhanced is modified by engagement with the plasma for a predetermined period of time.

5. Vacuum deposition treatment. In this process, the surface of the film layer is plasma treated in a vacuum chamber, for an 'atomically clean' surface with better adhesion properties.

Adhesion promotion can be achieved using reactive gases. These produce chemical species and free radicals which react with or deposit onto the surface, improving the affinity to the adherrant surface by forming chemical or electrical bonds. In one embodiment wherein non-reactive, noble gas plasma with heavy ions is used, the ions cause topographical changes to the surface and thereby improve mechanical bonding. They can also create surface radicals through mechanical damage to the atomic structure. These radicals can then participate in surface reactions and bonding.

In one embodiment, the vacuum plasma treatment is done at a temperature ranging between 40-120° C., and in a controlled environment inside a sealed chamber, which is maintained at a medium vacuum, usually 13-65 Pa, by the introduction of selected gases. The plasma gas can be inorganic or organic compounds. As examples of inorganic gas compounds, oxygen, nitrogen, helium, neon and argon can be used. Exemplary organic compounds include silanes, saturated and unsaturated hydrocarbons and aromatics.

6. Ionization radiation. Ionization tends to occur at higher energies than chemical dissociation. Typically, for a reactive gas, 104 in 106 molecules form free radicals whereas only 1 in 106 ionizes. Hence for reactive gases, the predominant plasma effect is from free radicals, but with the careful selection of process parameters using noble gases, ionic effects can predominate. One variation of vacuum deposition is ionization radiation, in which process the gas source is energized by an electrical field from DC to microwave frequencies, ranging from typically 1-5000 W at 500V.

The ionized gas causes modifications to occur at the film surface by etching, cross-linking, or film coating, depending on the treatment gas which is used. Oxygen gas ($O_2$) has been found to provide a surface etching phenomena. The use of argon gas (Ar), helium, or neon has been found to induce cross-linking of the surface polymer. In one embodiment wherein organic monomers are used, they provide surface coatings on the polymer film.

In one embodiment, the film layer surface is first activated or etched by the use of an organic or inorganic plasma, e.g., oxygen gas, after which the surface is contacted with the reactive monomer gas as the treatment gas for a desired coating layer which helps with the subsequent adhesion.

In another embodiment, ionized treatment is first performed followed by exposing the surface of the film layer to a non-ionized treatment gas for desired enhanced adhesion properties.

7. Chemical surface treatment. This method includes the application of chemical agents such as hydrochloric acid (HCl), hydro sulfuric acid ($H_2SO_4$), or other acids or bases to the surface of film layer to be "etched" or "surface enhanced" for a predetermined period of time to improve surface energy and bonding. Depending on whether the film layer to be etched is the weatherable outer coating layer or the substrate layer, the chemical etching modifies the outside of the layer for better acceptance and adhesion of the tie-layer or an adhesion coating film.

As mentioned above, these treatment methods may be used with mirror housings molded from resinous plastic materials or polymers which may optionally include adhesion promoting agents such as those described above, although such agents are not absolutely necessary.

8. Super high frequency (SHF) radiation coating. In one embodiment of the invention, a coating is applied onto at least one surface of one of the layers in the multilayer article, the multilayer article is assembled and exposed to milimetric-wave super high frequency SHF radiation until the contact surfaces reach different temperatures whereby the coating can be heated to melting without excessively heating the weatherable coating layer of the multilayer article. The results being ensured maximum adhesion therebetween with the physical properties of the multilayer article being unaffected.

Gyrotron can be used as a simple and efficient generator of milimetric waves, in the form of a Gaussian beam, having power in excess of 10 kilowatts, and at frequencies from 35 to 100 GHz.

9. Mechanical abrasion/texturing treatment. In one embodiment of the invention, the inner surface of the weatherable coating layer comprising resorcinol arylate chain members and/or at least one surface of the substrate layer may be "textured" or "abraded" by mechanical means to enhance the adhesion of the layers, e.g., between the tie-layer and the support substrate, in a subsequent process step. The mechanical texture/abrasion provides a greater contact area between surfaces, particularly when a tie-layer is used.

In one embodiment, the mechanical treatment to impart a textural finish to the surface by embossing or coining, done by embossing textures on the surface of the film layer while it is still warm, just rolling off the extrusion line. The film layer after being extrided by common methods is brought immediately into contact with a ground steel roll. The finish of the roll will imprint onto the film surface and control the texture thereof. In one embodiment, the roll finish has a 5 to about 65 microinch finish as measured by a commercially available surface analyzer instrument.

In a second embodiment, the mechanical treatment is via the use of a hot embosser bearing an image or pattern, which is to be transferred to the cooled film layer to be textured. In one application, the temperature of the hot embosser is be between about 125 and 175° C.

In yet another embodiment, both the contact surface of the substrate layer (of the multilayer article) and the contact surface of the substrate to which the multilayer article is adhered are mechanically textured, with one surface being the negative image of the other surface, creating crevices on the surface into which the substrate can flow, resulting in a mechanical interlocking for excellent bonding between the surfaces.

EXAMPLES

The following description will illustrate embodiments of the multilayer articles of the present invention and methods of manufacturing the multilayer articles of the present invention, some examples with reference to the attached drawings. Unless otherwise specified, the weatherable coating layer comprises a resorcinol arylate-containing block copolyester-carbonate ("ITR") prepared according to Example 65 of Patent Application WO0069945.

Example 1

In one embodiment of the invention, the multilayer article is formed by having the weatherable coating layer comprising ITR "coated" onto a substrate via coating method using an electro-hydrodynamic spray. In Example 1, ITR is dispersed in a solvent along with a number of additives including but not limited to absorbents, accelerators, adhesion promoters, adiapates, anti-blocking agents, anti-foam agents, binders, flame proofing agents, blowing agents, coloring pigments, flow control agents, initiators, light stabilizers, optical brighteners, microbicides, ozone restrictors, thickeners, waxes, and auxiliary processing materials. The mixture is heated to a flowable state of high viscosity, with a surface tension of about 10 to 100 dyne/cm. The heating is done at the last part, i.e., nozzle, of a cone-jet electro dynamic jetting and dispersion device. The device is provided with a control electrode to enhance the stability of the dispersion. The nozzle is heated by means of an electrode. The ITR in the form of a sprayable and flowable stream, is sprayed onto the substrate layer, thus forming a weatherable coating layer.

Example 2

In example 2, ITR is melt-extruded onto a rotating cooled drum to form a film having a thickness of about 1 mil. The ITR film is then laminated to a tielayer film from Adhesive Films, Inc. sold under the trade name Xiro XAF 36.154. The substrate layer is available in the form of a thermoformable carrier layer, e.g., a polypropylene copolymer, available from Exxon as Extrel23.

Figure 3:
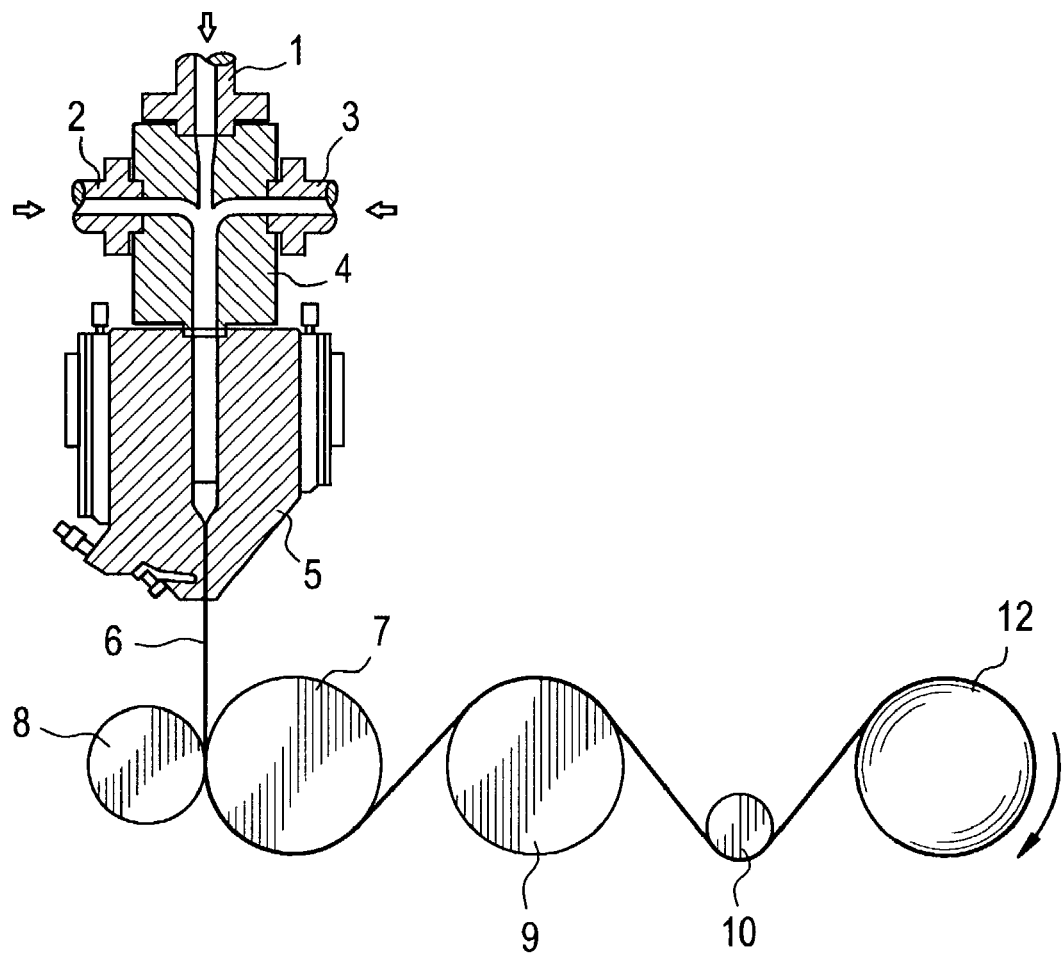
FIG. 3 is a schematic view illustrating of a method of manufacturing the multilayer article in accordance with one embodiment of the invention via the co-extrusion process.

FIG. 3 is an illustration of example 2. A first roll 10 of the ITR weatherable coating layer, a second roll 15 of the tie-layer adhesive film, and a third roll 20 of the substrate layer are directed to tack station 14 comprising rollers 16, 18 for tacking together within the nip 24 of tacking station 14. The multilayer article/joint film 26 is formed at tacking station 14. The multilayer film continues to a heating station 28 comprising upper and lower heaters 30 and 32. The film 26 is heated to a temperature and optionally compressed at a first pressure which is sufficient for thermofusing the layers together into heated joint film 34.

The film is optionally directed to a thermoforming and bonding station 36, wherein a second pressure in the range of 10 to 100 psi may be applied to remove all air gaps between the layers. The temperatures sufficient for the thermofusing step in one embodiment are in the range of about 250 to 450° F., and may be modified depending on the final application, the type and thickness of the layers being utilized.

Of course, more than three different and additional layers, i.e., additional tie-layers, additional substrate layers in the form of separate sheets, may be directed to the tacking station 14 along with the coating layer, the tie-layer, and the substrate layer as illustrated in FIG. 2.

Example 3

In this example, the adhesive tie-layer roll 15 is omitted and the surface of the substrate layer opposite the weatherable coating layer is surface enhanced by being pre-treated by a spray gun. The spray gun sprays a coating of adhesive onto the surface of the substrate layer as it rolls off roll 20, and prior to its being directed to tacking station 14.

Other surface enhancement techniques can be used or applied onto the surface of the substrate layer as it rolls off roll 20, or onto the inner surface of the coating layer as the coating layer rolls off roll 10. At least one of the surfaces can be treated or enhanced by any of the following techniques or combinations thereof: surface corona treatment, flame treatment, plasma surface treatment, vacuum deposition treatment, ionization radiation, chemical surface treatment, and mechanical abrasion/texturing treatment.

Example 4

In this example 4, resorcinol arylate-containing block copolyester-carbonate (ITR) is prepared according to Example 48 of Patent Application WO0069945 for use in the weatherable layer of the multilayer article. A commercially available polycarbonate resin from General Electric Company is used for the substrate layer. The resins are dried overnight to drive out residual moisture, and then melt-extruded separately as molten. The molten polymers are fed together to a single-layer die and then extruded in the form of a film. The extrusion conditions are as listed in Table 1.

TABLE 1

|  | Extruder 1 | Extruder 2 | Final Extruder |
|---|---|---|---|
| Extruder diameter | | 2 in. | |
| Drying time | | Overnight | |
| Drying temperature | | 240° F. | |
| Extruder temperature ° F. | | | |
| Zone 1 | 470 | 525 | 540 |
| Zone 2 | 490 | 540 | 546 |
| Zone 3 | 500 | 565 | 560 |
| Zone 4 | 515 | 565 | 548 |
| Zone 5 | 530 | 580 | 540 |
| Roll stack temperature ° F. | 130 | 230 | 280 |
| Pressure (psi) | 1675 | 810 | |
| Extruder Amps | 85 | 6 | |
| Adapter temperature ° F. | 550 | | |
| Line speed (fps) | 14.70 | | |

The resulting two-layer film of 20 mil (4 mil of the weatherable coating layer comprising ITR and 16 mil of the polycarbonate substrate layer) is optically transparent with excellent appearance.

Examples 5-10

In examples 5-10, various multilayer articles are prepared and tested. Using a co-extruder with an adapter/feedblock, a multilayer film is prepared. The film constitutes a layer of resorcinol arylate polymer prepared according to Example 6 of published patent application No EP 1124878 and a layer of commercially available polycarbonate. This multilayer structure is adhered to plaques using various tie layers. The tie-layers are commercially available from Sarna Xiro AG and supplied by Adhesive Films, Inc., US. The plaques are produced by compression molding of unsaturated polyester resin (UPR) based SMC with the molding conditions of 130° C., 1200 psi for 15 minutes. Results of adhesion test measuring the adhesion of the two-layer film to the plaques, measured as peel strength in a 90° peel test, are shown in Table 2. As can be seen from Table 2, the Examples 5 and 7-10 had a peel strength of at least 700 Newtons per meter (N/m) (4.0 lb/in), and many of the Examples had a peel strength, of at least 1,750 N/m (10 lb/in).

TABLE 2

| Tie-layer used | Tie-layer material/Layer(s) used | Peel strength (lb/in) |
|---|---|---|
| NONE | NONE | 3.02 ± 1.25 |
| Sarna Xiro XAF 2061 | EVA single tie-layer film | 13.38 ± 3.51 |
| Sarna Xiro Puro L | TPU single tie-layer film | 2.82 ± 0.35 |

TABLE 2-continued

| Tie-layer used | Tie-layer material/Layer(s) used | Peel strength (lb/in) |
|---|---|---|
| Sarna Xiro V660 | Copolyester/EVA bilayer (Copolyester side in contact with PC substrate layer) | 9.09 ± 3.14 |
| Sarna Xiro V660 | EVA/Copolyester bilayer (EVA side incontact with PC substrate layer) | 16.52 ± 0.57 |
| Sarna Xiro V660 folded over | Copolyester/EVA/Copolyester tri-layer | 10.64 ± 0.65 |
| Sarna Xiro 662 folded over | Copolyamide/PP/Copolyamide tri-layer | >>20 |

Example 11

Using a co-extruder with an adapter/feedblock, a multilayer film is prepared. The film constitutes a layer of resorcinol arylate polymer prepared according to Example 6 of published patent application No. EP 1124878 and a layer of commercially available polycarbonate. A laminate film, Xiro XAF 36.154, is placed onto co-extruded multilayer film structure.

The multilayer structure is placed into a mold, the mold closed, and a flowable resin such as polypropylene is injected into the mold behind the multilayer film. The polypropylene and the laminate structure are then molded for a sufficient amount of time and at a sufficient temperature to form a shaped article, with the coating layer comprising resorcinol arylate polyester chain members bonded to the surface thereof of the molded substrate.

Examples 12-22

In these examples, a number of polyestercarbonate and polycarbonate blends are prepared. The blends are tested for clarity, Tg, heat distortion temperature HDT, and impact strength before being further processed as tie-layers in the multilayer article of the present invention.

The results of the test are presented in Table 3. Examples 12-22 are blends of either PPC/PCE and ITR, with the weight % of PPC or PCE is as shown, and ITR resins making up the balance. "PPC" is a copolyestercarbonate comprising isophthalate and terephthalate ester units, with 93% isophthalate and 7% terephthalate, and with the BPA arylates units comprising 80% of the weight. "PCE" is a copolyestercarbonate comprising isophthalate and terephthalate ester units, with 50% isophthalate and 50% terephthalate, and with the BPA arylate units comprising 60% of the weight. The resultant blends are injection molded at 620° F. into test specimens ⅛" thick. N.I. is notched izod impact strength measured according to ASTM D256 at room temperature (RT of 23° C.). Color (clarity) data is measured using a MacBeth ColorEye 700A colorimeter. The glass transition temperature Tg is measured at 20° C./min. on the 2° C./min. on the $2^{nd}$ heat cycle.

TABLE 3

Properties of PPC and or PCE / PC blends for use as tie-layers.

| Ex. | PPC wt % | PCE wt % | L* | a* | b* | % T | % H | $T_g$, ° C., Phase 1 | $T_g$, ° C., Phase 2 | HDT ° C. 264 psi | NI lb-ft/in |
|---|---|---|---|---|---|---|---|---|---|---|---|
| 12 | 0 | — | 94.13 | −1.63 | 6.65 | 85.58 | 1.12 | 136.7 | — | 114.1 | 4.1 |
| 13 | 25 | — | 81.86 | −1.26 | 14.98 | 60.05 | 58.19 | 140 | 163.6 | 122 | 6.6 |
| 14 | 50 | — | 77.30 | 0.33 | 21.61 | 52.03 | 36.88 | 143.9 | 163.03 | 128.2 | 8 |
| 15 | 75 | — | 86.15 | −0.54 | 12.39 | 68.29 | 19.05 | 148.8 | 169.7 | 138.5 | 9.9 |

TABLE 3-continued

Properties of PPC and or PCE / PC blends for use as tie-layers.

| Ex. | PPC wt % | PCE wt % | L* | a* | b* | % T | % H | $T_g$, °C., Phase 1 | $T_g$, °C., Phase 2 | HDT °C. 264 psi | NI lb-ft/in |
|---|---|---|---|---|---|---|---|---|---|---|---|
| 16 | 80 | — | 89.19 | −1.30 | 11.39 | 74.56 | 11.60 | 150.6 | 170.01 | — | 9.7 |
| 17 | 85 | — | 90.93 | −1.36 | 9.68 | 78.34 | 6.71 | 151 | 171.63 | — | 10.4 |
| 18 | 90 | — | 93.14 | −1.21 | 6.59 | 83.28 | 3.01 | — | 174.88 | — | 10 |
| 19 | 95 | — | 95.19 | −0.82 | 2.95 | 88.07 | 0.60 | — | 174.86 | — | 9.2 |
| 20 | 0 | 25 | 76.05 | −1.24 | 17.96 | 49.96 | 85.08 | 139.1 | 160 | 119.2 | 11.5 |
| 21 | 0 | 50 | 68.90 | 1.72 | 25.62 | 39.21 | 63.03 | 143.6 | 162.1 | 126.5 | 10 |
| 22 | 0 | 75 | 77.85 | −0.63 | 17.24 | 52.95 | 51.34 | 146.2 | 166.89 | 136 | 9.6 |

Examples 23-33

In examples 23-33, using a co-extruder with an adapter/feedblock, a multi-layer film is prepared. The film constitutes a layer of arylate polymer prepared according to Example 6 of published patent application No. EP 1124878 and tie-layer(s) prepared from the PPC and PCE-ITR blends of examples 12-22. The multi-layer film is used in a subsequent molding operation. A substrate is injected onto the tie-layer side of the multi-layer film to give a multi-layer article comprising: a) a substrate layer; b) a tie-layer of Examples 12-22, and c) a coating or top layer of resorcinol arylate polymers. An Instron 90 degree adhesion peel test is used to test the adhesion between the film and the injection molding resin. An Instron 180 degree adhesion peel test is conducted to test the adhesion between the tie-layer and the weather coating layer.

Example 34

In this example, multilayer articles in the form of solid sheets, twin and triple walled panels, and multi-wall sections (collectively, MWS) are produced by a co-extrusion process, with the weatherable layer comprising resorcinol arylate-containing block copolyester-carbonate (ITR) being used as a coating on either one or both sides of the MWS. The substrate layer or the MWS is a base sheet of thermoplastic polycarbonate. The ITR resin is prepared according to Example 48 of Patent Application WO0069945.

In some examples, a UV absorber selected from the group of benzophenones, benzotriazoles, triazines, oxanilides, cyanoacrylates and cycli imino esters (also referred to benzoxazinones) is used. In other examples, a hydrophilic coating as described in U.S. Pat. No. 5,262,475, with low contact angle with water (10-20 degree) is further coated onto the weatherable coating layer. These hydrophilic coating are described in the following references: U.S. Pat. No. 5,262,475

The device for co-extruding the multilayer article, i.e., the MWS, of the present invention consists of a main with a degassing facility, a coextrusion adapter (feedblock system), a coextruder for applying the weatherable coating layer comprising ITR, a sheet extrusion die, a sizing device, a roller track, a pull-off device, a device for cutting into lengths (saw), and a delivery table.

In the examples, the polycarbonate granules forming the base sheets are fed to the filling hopper of the main extruder, and the ITR resin for the weatherable coating layer is fed to that of the coextruder. Melting and conveying of the respective material are effected in the respective cylinder/screw plasticizing system. The two molten materials are brought together in the coextrusion adapter and formed a composite after leaving the extrusion die and cooling in the sizing device. The other devices are employed for the transport, cutting into lengths and deposition of the extruded sheets.

The multi-wall sheets are subject to the Table Abrasion test (ASTM D1044 with CS-10F wheels) using 100 cycles, a chemical resistance test in which the sheets are cleansed with a cheesecloth soaked in methyl ethyl ketone (MEK), and a UV resistance test in which the sheets are weathered in a Xenon Arc weather-o-meter using a modified SAE J1960 protocol, with the change in haze and gloss being recorded before and after.

Example 35-37

Using a co-extruder with an adapter/feedblock, a multi-layer film is prepared. The film constitutes a layer of resorcinol arylate polymer prepared according to Example 6 of published patent application No. EP 1124878 and a layer of commercially available polycarbonate. A multilayer article comprising the multilayer film is prepared over SMC or BMC, with the following results:

| Example | Samples/Conditions | Results |
|---|---|---|
| 35 | SOLLX/commercial SMC | Good surface and adhesion |
| 36 | SOLLX/TSN | Good surface, poor adhesion |
| 37 | SOLLX/commercial SMC | Very good surface, excellent adhesion |

The samples are prepared by compression molding using the multilayer film over either SMC or BMC. One sample is made with Thermosetting Noryl (TSN) based BMC. TSN is a commercially available material from General Electric Company. The samples are formed and held in a heated mold until the reaction is deemed completed, but at a mold temperature (150-180° F.) that does not soften the coating layer comprising resorcinol arylate polymer sufficiently to degrade the surface appearance. Cycle times and pressure profiles varied greatly, since different presses and molds are used in each case.

Example 38

Using a co-extruder with an adapter/feedblock, a three-layer sheet is prepared. The sheet constitutes two outer film layers of resorcinol arylate polymer prepared according to Example 6 of published patent application No. EP 1124878, and an inner layer sheet having a thickness of 3 mm comprising a commercially available polycarbonate.

The sheet is further subject to vacuum forming by first being dried for four hours at 125° C. It is next heated to reach 240° C. surface temperature for about 15 seconds. It is observed that there is no sagging in the sheet due to air support. Vacuum forming is next for about 3 to 5 seconds into a desired shape, with the following properties being measured: vacuum-formability, taber abrasion, impact behaviour, cap-layer thickness after forming, weathering performance, and optical inspection.

It is observed that the sheet having outer layers of resorcinol arylate polymer forms better than sheet having outer layers of polycarbonate film. Additionally, the surface stretching after forming is very uniform with no tearing occurs. There is no delamination at any point. Furthermore, the impact strength is the same or as expected of a similar sheet having polycarbonate as caplayers.

An article similarly formed as in this example 38 can be used in a number of different applications, including architectural applications as windows, skylights, and partitions. The article can also be used in automotive applications, including windows for transportation vehicles such as cars, trucks, boats, and trains.

Example 39

In the example, the multilayer article assembly comprised a layer of copolyestercarbonate film and a layer of polycarbonate film. The copolyestercarbonate film comprised a copolyestercarbonate with arylate structural units derived from unsubstituted resorcinol, isophthalic acid, and terephthalic acid, and carbonate structural units derived from bisphenol A. The polycarbonate film comprised bisphenol A polycarbonate. The abbreviation "PU" means polyurethane. The abbreviation "SMC" means sheet molding compound. The abbreviation "TSN" means thermoset NORYL, a material obtained from General Electric Plastics. TSN comprised a major amount of a poly(2,6-dimethylene-1,4-phenylene ether) of low intrinsic viscosity and a minor amount of a crosslinkable acrylic ester monomer, along with various amounts of fillers, additives, and curing agents.

Examples 40-42

Laminates of copolyestercarbonate-polycarbonate film assembly onto e-coated steel with PU adhesive tie-layer: The two-component PU tie-layer adhesives, ARALDITE 2040, 2042, and AW8680/HW8685, were obtained from Vantico Inc. (formerly Ciba Performance Specialty Polymers). Both ARALDITE 2040 and 2042 contained polymeric methylene diphenyl diisocyanate and primarily polyether polyols. ARALDITE 2042 contained only polyether polyols. E-coated steel test panels were obtained from ACT Laboratories (ACT #APR 31330). The e-coated metal was electrozinc galvanized steel typically used for automotive body panels which was cleaned, phosphate treated, and finally e-coated with PPG e-coating formulation (type ED5100). A copolyestercarbonate-polycarbonate film assembly was prepared by coextruding a 10 mil thick clear copolyestercarbonate film with a 20 mil thick pigmented, cranberry-colored polycarbonate layer containing metal flakes for metallic effects. The PU adhesive components were thoroughly mixed in paste form and uniformly applied to the dried e-coated metal substrates in a thin layer by using an application gun and attached static mixer pipe. A copolyestercarbonate-polycarbonate film assembly, which had been surface-washed with deionized water and oven dried, was then put on top of the adhesive with the polycarbonate film side in contact with the adhesive. This combined assembly was placed in a Carver press and heated on both sides under 689 kilopascals pressure for 10 to 30 minutes at temperatures given in the Table. The copolyestercarbonate-polycarbonate film assembly adhered well to the substrates. Samples were cut into one-inch wide stripes and tested for adhesion using a 90-degree peel test with a crosshead separation speed of one inch per minute using an Instron testing device (Model 4505). The adhesion strength of the tie layer with copolyestercarbonate-polycarbonate film assembly and metal substrate was measured by the peel force in Newtons per meter (N/m). The adhesion results are shown in

TABLE 4

| Example | Adhesive | Molding T (° C.) | Molding time - min. | Peel force (N/m) | Failure mode |
|---|---|---|---|---|---|
| 40 | ARALDITE 2040 | 100 | 30 | 5779 | Cohesive PU |
| 41 | ARALDITE 2042 | 100 | 10 | 4903 | Interfacial PU/steel |
| 42 | AW8680/ HW8685 | 60 | 90 | 4028 | Interfacial PC/PU |

In each example the adhesion strength of the copolyestercarbonate-polycarbonate film assembly to the metal substrate was found to be excellent.

Examples 43-44

Laminates of copolyestercarbonate-polycarbonate film assembly onto cleaned and chemical conversion coated steel with PU tie-layer: A laminate was prepared according to Examples 1-3 with copolyestercarbonate-polycarbonate film assembly onto a cold-roll steel test panel (cleaning and chemical conversion pretreated) obtained from ACT Laboratories (ACT #APR 32488) using PU adhesives. The adhesion results are shown in Table 5.

TABLE 5

| Example | Adhesive | Molding temp. (° C.) | Molding time (min.) | Peel force (N/m) | Failure mode |
|---|---|---|---|---|---|
| 43 | ARALDITE 2042 | 100 | 30 | 2802 | Interfacial PU/steel |
| 44 | ARALDITE 2040 | 100 | 10 | 2101 | Interfacial PU/steel |

In each example the adhesion strength of the copolyestercarbonate-polycarbonate film assembly to the metal substrate was found to be excellent.

Examples 45-46

Laminates of copolyestercarbonate-polycarbonate film assembly onto SMC with PU tie-layer: Smooth surface, class "A" SMC was received from the Budd Company (Budd product #DSM-971) and comprised unsaturated polyester resin with curing agents and fillers. SMC prepreg was cured into a large panel at 149° C. and 8273 kilopascals for 90 seconds. Test panels of dimension four-inches-by-six-inches were cut from the molded SMC panels and were cleaned with deionized water and dried. A laminate was prepared according to Examples 1-3 with copolyestercarbonate-polycarbonate film assembly onto the SMC test panel using PU adhesives. The adhesion results are shown in Table 6.

TABLE 6

| Example | Adhesive | Molding temp. (° C.) | Molding time (min.) | Peel force (N/m) | Failure mode |
|---|---|---|---|---|---|
| 45 | ARALDITE 2042 | 100 | 30 | 5954 | Interfacial PU/SMC |
| 46 | ARALDITE 2040 | 100 | 10 | 7005 | Cohesive PU |

In each example the adhesion strength of the copolyester-carbonate-polycarbonate film assembly to the cured thermoset substrate was found to be excellent.

Examples 47-48

Laminates of copolyestercarbonate-polycarbonate film assembly onto TSN with PU tie-layer: A TSN formulation was cured into a twelve-inch-by-twelve-inch panel at 150° C. for 4 minutes under 6894 kilopascals pressure. Test panels of four-inch-by-six-inch dimensions were cut from the molded TSN panels and were cleaned with deionized water and dried. A laminate was prepared according to Examples 1-3 with copolyestercarbonate-polycarbonate film assembly onto the TSN test panel using PU adhesives. The adhesion results are shown in Table 7.

TABLE 7

| Example | Adhesive | Molding temp. (° C.) | Molding time (min.) | Peel force (N/m) | Failure mode |
|---|---|---|---|---|---|
| 47 | ARALDITE 2042 | 100 | 30 | 2802 | Interfacial PU/TSN |
| 48 | ARALDITE 2040 | 100 | 10 | 2627 | Interfacial PU/TSN |

In each example the adhesion strength of the copolyester-carbonate-polycarbonate film assembly to the cured thermoset substrate was found to be excellent.

Examples 49-52

Laminates of copolyestercarbonate-polycarbonate film assembly onto e-coated steel and chemical conversion coated steel: Aliphatic thermoplastic polyurethane film, grades PE393 and PE399, of 50 mil thickness were obtained from JPS Elastomerics Corp. DUREFLEX A4700 polyurethane film of 50 mil thickness was obtained from Deerfield Urethane, Inc. Each type of PU film was laminated to a copolyestercarbonate-polycarbonate film assembly at 110° C. and 344 kilopascals for 2 minutes using a hot press. E-coated steel test panels were obtained from ACT Laboratories (ACT #APR26782). The e-coated metal was cold-roll steel which was cleaned, phosphate treated, and finally e-coated with PPG e-coating formulation. The copolyestercarbonate-polycarbonate film assembly with PU laminated to the polycarbonate side was then put on top of the e-coated steel substrate with PU film layer in contact with the metal surface. Each assembly was placed in a Carver press and heated on both sides under 689 kilopascals pressure and 127° C. for 10 minutes. The copolyestercarbonate-polycarbonate film assembly adhered well to the substrates. The adhesion strength of the tie layer with copolyestercarbonate-polycarbonate film assembly and metal substrate was measured by the peel force.

TABLE 8

| Example | Substrate | PU adhesive film | Peel force (N/m) | Failure mode |
|---|---|---|---|---|
| 49 | e-coated steel | PE393 | 13,414 | Interfacial PU/steel |
| 50 | e-coated steel | PE399 | 24,902 | Interfacial PU/steel |
| 51 | e-coated steel | A4700 | 20,944 | Interfacial PU/steel |
| 52 | pretreated steel | A4700 | 2504 | Interfacial PU/steel |

In each example the adhesion strength of the copolyester-carbonate-polycarbonate film assembly to the metal substrate was found to be excellent.

Examples 53-54

Laminates of the multilayer article of the present invention, e.g., the copolyestercarbonate-polycarbonate film assembly, onto e-coated Aluminum and chemical conversion coated Aluminum: E-coated aluminum test panels were obtained from ACT Laboratories (ACT #APR 41719). E-coated aluminum panels of the type used for automotive body panels had been cleaned, phosphate treated, and finally e-coated with PPG lead-free e-coating formulation. (type ED6100H). Pretreated aluminum panels (cleaned and chemical conversion pretreated using Henkel immersion phosphate) were also obtained from ACT Laboratories (ACT #APR 41718). Laminates were prepared according to Examples 10-13 (except as noted) with copolyestercarbonate-polycarbonate film assembly onto an aluminum substrate using the PU film adhesive DUREFLEX A4700 of 25 mil thickness. The adhesion results are summarized in Table 9.

TABLE 9

| Example | Substrate | Molding temp. (° C.) | Mold press. (kPa) | Peel force (N/m) | Failure mode |
|---|---|---|---|---|---|
| 53 | e-coated Al | 121 | 172 | 26,180 | Interfacial PU/Al & PU/PC |
| 54 | pretreated Al | 127 | 689 | 7968 | Interfacial PU/Al |

In each example the adhesion strength of the copolyester-carbonate-polycarbonate film assembly to the metal substrate was found to be excellent.

Examples

Adhesion Environmental Stability Tests

Adhesion environmental stability data for laminates of multilayer article of the present invention, the copolyester-carbonate-polycarbonate film assembly, onto e-coated steel and SMC: Multilayer structures of copolyestercarbonate-polycarbonate film assembly over e-coated steel or SMC or e-coated aluminum, the same as those in examples 1-2 and 10-12, examples 6-7, and example 14, respectively, were prepared and subjected to a full cycle crack resistance test under varying conditions of temperature and humidity. Each full cycle involved holding the sample successively for 24 hours at 84° C., 16 hours at 38° C. and 98% relative humidity, 6 hours at minus 29° C., and 2 hours at 23° C. Each sample was subjected to 15 cycles. All samples were visually inspected after the full cycle crack test and were found to have no macroscopic delamination or other film-related failure. These four-inches-by-six-inches cycle cracked samples were then cut into one-inch-by-six-inches test specimen for 90-degree peel test at one inch per minute cross-head separation speed. The results are summarized in Table 10.

TABLE 10

| Ex. | Substrate | Adhesive/ Thickness of adhesive | Peel strength after cycle crack test (N/m) | Peel failure mode |
|---|---|---|---|---|
| 55 | e-coated steel | ARALDITE 2040 5 mil | 5779 | Cohesive PU and interfacial PC/PU |
| 56 | e-coated steel | ARALDITE 2042 5 mil | 175-525 | Interfacial PC/PU |
| 57 | SMC | ARALDITE 2040 20 mil | 3520 | Interfacial PC/PU |
| 58 | SMC | ARALDITE 2042 20 mil | 350 | Interfacial SMC/PU |
| 59 | e-coated steel | PE393 50 mil film | 17,845 | — |
| 60 | e-coated steel | PE399 50 mil film | 21,102 | — |
| 61 | e-coated steel | A4700 50 mil film | 28,387 | — |
| 62 | e-coated Al | A4700 25 mil film | 24,201 | — |

The results showed that adhesion provided to multilayer film assembly and e-coated steel by ARALDITE 2040 and the three types of polyurethane film is environmentally stable, and adhesion strength remains excellent after the full cycle crack test protocol. Although the invention is not dependent upon any theory of action, this excellent adhesion stability may be due to the hydrolytic stability and/or low modulus of ARALDITE 2040 and of the three types of polyurethane film which allows them to accommodate any CTE mismatch between copolyestercarbonate-polycarbonate film assembly and low CTE substrates.

What is claimed is:

1. A multilayer structure comprising:
   an outer layer comprising resorcinol arylate polyester chain members,
   a tie-layer comprising polyurethane, and
   a substrate layer comprising at least one of a thermoplastic polycarbonate, a thermoplastic polyester, a polyolefin, a polyamide, a polyacrylonitrile, a polystyrene, and a polyvinyl chloride;
   wherein an adhesion of the tie-layer to the substrate layer provides a ninety-degree peel force of at least 1,750 Newtons per meter.

2. A multilayer article comprising:
   a coating layer comprising a block copolyestercarbonate comprising structural units derived from a 1,3-dihydroxybenzene and an aromatic dicarboxylic acid,
   a second layer comprising a polymer comprising carbonate structural units,
   a tie-layer comprising a polyurethane, and
   a substrate layer,
   wherein the coating layer is in contiguous superposed contact with the second layer, and the tie-layer is in contiguous contact with the second layer and the substrate layer; and
   wherein an adhesion of the tie-layer to the substrate layer provides a ninety-degree peel force of at least 1,750 Newtons per meter.

3. The article of claim 2 wherein the 1,3-dihydroxybenzene comprises at least one of unsubstituted resorcinol, 2-methyl resorcinol, and mixtures thereof.

4. The article of claim 3 wherein the 1,3-dihydroxybenzene is unsubstituted resorcinol.

5. The article of claim 2 wherein the aromatic dicarboxylic acid is selected from the group consisting of isophthalic acid, terephthalic acid, naphthalene-2,6-dicarboxylic acid, and mixtures thereof.

6. The article of claim 5 wherein the aromatic dicarboxylic acid is a mixture of isophthalic acid and terephthalic acid.

7. The article of claim 6 wherein the ratio of isophthalic-derived structural units to terephthalic-derived structural units is about 0.25-4.0:1.

8. The article of claim 7 wherein the ratio of isophthalic-derived structural units to terephthalic-derived structural units is about 0.40-2.5:1.

9. The article of claim 2 wherein the copolyestercarbonate comprises about 10% to about 99% by weight arylate blocks.

10. The article of claim 2 wherein the copolyestercarbonate comprises about 60% to about 98% by weight arylate blocks.

11. The article of claim 2 wherein the carbonate portion of the copolyestercarbonate comprises structural units derived from bisphenol A.

12. The article of claim 2 wherein the second layer comprises a bisphenol A polycarbonate.

13. The article of claim 12 wherein the second layer further comprises a colorant selected from the group consisting of dyes, pigments, metal flakes, and glass flakes.

14. The article of claim 2 wherein the polyurethane comprises structural units derived from a polyol selected from the group consisting of polyether polyols, polyester polyols, and polyols based on polybutadiene.

15. The article of claim 14 wherein at least one of the second layer and the substrate is a polycarbonate-comprising layer, and wherein the adhesion of the tie-layer to the polycarbonate-comprising layer provides a ninety-degree peel force of at least 2,344 Newtons per meter.

16. The article of claim 15 wherein the adhesion of the tie-layer to the polycarbonate-comprising layer provides a ninety-degree peel force of at least 2,894 Newtons per meter.

17. The article of claim 2 wherein the substrate layer comprises at least one of a thermoplastic resin, a thermoset resin, a metal, a ceramic, a glass, and a cellulosic material.

18. The article of claim 15 wherein thicknesses of layers are as follows:
   said coating layer is about 2-2,500 microns,
   said second layer is about 2-2,500 microns; and
   said tie-layer is about 8-2,500 microns.

19. The multilayer structure of claim 1, wherein at least a part of a surface of at least one of said outer layer, said tie-layer, and said substrate layer is modified by a technique selected from at least one of: surface adhesive treatment, surface corona treatment, flame treatment, plasma surface treatment, vacuum deposition treatment, ionization radiation, chemical surface treatment, surface abrasion treatment, and surface texturing treating.

20. The multilayer structure of claim 1, wherein the substrate further comprises benzoxazinone.

21. The multilayer article of claim 2, wherein the substrate further comprises benzoxazinone.

22. A multilayer structure consisting essentially of:
   an outer layer comprising resorcinol arylate polyester chain members,
   a tie-layer comprising polyurethane, and
   a substrate layer comprising at least one of a thermoplastic polycarbonate, a thermoplastic polyester, a polyolefin, a polyamide, a polyacrylonitrile, a polystyrene, and a polyvinyl chloride
   wherein an adhesion of the tie-layer to the substrate layer provides a ninety-degree peel force of at least 1,750 Newtons per meter.

23. The multilayer structure of claim 1, wherein the substrate layer comprises polycarbonate.

24. The multilayer structure of claim 1, wherein the ninety-degree peel force is at least 2,344 Newtons per meter.

25. A multilayer structure comprising:
an outer layer comprising resorcinol arylate polyester chain members;
a tie-layer comprising polyurethane; and
a substrate layer comprising a metal;
wherein an adhesion of the tie-layer to the substrate layer provides a ninety-degree peel force of at least 2,101 Newtons per meter.

26. The multilayer structure of claim 25, wherein the substrate layer comprises steel.

27. The multilayer structure of claim 25, wherein the substrate layer comprises aluminum.

28. The multilayer structure of claim 25, wherein the ninety-degree peel force is at least 2,802 Newtons per meter.

29. The multilayer structure of claim 1, wherein the substrate layer comprises polyacrylonitrile.

30. The article of claim 17, wherein the substrate comprises at least one of a thermoplastic polycarbonate, a thermoplastic polyester, a polyolefin, a polyamide, a polyacrylonitrile, a polystyrene, and a polyvinyl chloride.

31. The article of claim 30, wherein the substrate comprises at least one of a polyolefin, a polyamide, a polyacrylonitrile, a polystyrene, and a polyvinyl chloride.

32. The article of claim 17, wherein the substrate layer comprises steel.

33. The article of claim 17, wherein the substrate layer comprises aluminum.

34. The article of claim 2, wherein an adhesion of the tie-layer to the second layer provides a ninety-degree peel force of at least 1,750 Newtons per meter.

* * * * *